(12) United States Patent
Matsumoto et al.

(10) Patent No.: US 7,509,179 B2
(45) Date of Patent: Mar. 24, 2009

(54) DISTRIBUTION SYSTEM

(75) Inventors: Masaharu Matsumoto, Katano (JP);
Takashi Katayama, Hirakata (JP);
Masahiro Sueyoshi, Hirakata (JP);
Kousuke Nishio, Moriguchi (JP);
Kakeshi Fujita, Takatsuki (JP); Akihisa Kawamura, Hirakata (JP); Kazutaka Abe, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1953 days.

(21) Appl. No.: 09/940,590

(22) Filed: Aug. 29, 2001

(65) Prior Publication Data
US 2002/0025141 A1    Feb. 28, 2002

(30) Foreign Application Priority Data
Aug. 29, 2000    (JP)    .............................. 2000-258534

(51) Int. Cl.
*G06F 17/00* (2006.01)
(52) U.S. Cl. ....................................................... 700/94
(58) Field of Classification Search .................. 700/94;
380/28, 201, 203
See application file for complete search history.

(56) References Cited

U.S. PATENT DOCUMENTS

| | | | | |
|---|---|---|---|---|
| 6,917,923 B1 * | 7/2005 | Dimenstein | ................... | 705/51 |
| 7,020,704 B1 * | 3/2006 | Lipscomb et al. | ............ | 709/226 |
| 7,054,443 B1 * | 5/2006 | Jakubowski et al. | .......... | 380/28 |
| 7,076,432 B1 * | 7/2006 | Cheah et al. | ................. | 704/500 |
| 7,158,953 B1 * | 1/2007 | DeMello et al. | ................ | 705/51 |

* cited by examiner

*Primary Examiner*—Curtis Kuntz
*Assistant Examiner*—Andrew C Flanders
(74) *Attorney, Agent, or Firm*—Wenderoth, Lind & Ponack, L.L.P.

(57) ABSTRACT

A distribution system includes a distribution server device, an acquisition device, and an audio reproduction device, and distributes a program for decoding encoded audio data. The distribution server device sends the program for decoding the encoded audio data. The acquisition device is connected to the distribution server device via a network, and acquires the program and stores it in a removable memory unit. The audio reproduction device decodes the encoded audio data using the program stored in the removable memory unit, and outputs sounds.

13 Claims, 31 Drawing Sheets

FIG. 3

DECODE PROGRAM TABLE
111

| DECODE PROGRAM NUMBER | DECODE PROGRAM NAME | AUTHENTICATION CODE | DECODE PROGRAM | PROVISION CATEGORY | USE CONDITION SETTING INFORMATION | | | FEE INFORMATION | MAINTENANCE INFORMATION PRESENCE INFORMATION | MAINTENANCE INFORMATION |
|---|---|---|---|---|---|---|---|---|---|---|
| | | | | | TIME LIMIT SETTING INFORMATION | USE NUMBER SETTING INFORMATION | | | | |
| 1 | ABC | abcd | PROGRAM | CHARGEABLE | SETTABLE | NOT SETTABLE | | ¥100/MONTH | PRESENT | PROGRAM |
| 2 | XYZ | xyz | PROGRAM | CHARGEABLE | NOT SETTABLE | SETTABLE | | ¥10/USE | PRESENT | PROGRAM |
| 3 | EE12 | ee12 | PROGRAM | CHARGEABLE | NOT SETTABLE | NOT SETTABLE | | ¥100 | PRESENT | PROGRAM |
| 4 | CCD | ccd13 | PROGRAM | FREE | 2001/1/1-2001/12/3 | 10 | | — | ABSENT | — |
| ---- | ---- | ---- | ---- | ---- | ---- | ---- | | ---- | ---- | ---- |

FIG. 5

CUSTOMER INFORMATION TABLE 112

| USER ID | TRADER ID | USE CONDITION INFORMATION ID | CUSTOMER INFORMATION ||| | |
|---|---|---|---|---|---|---|---|
| | | | USE CONDITION DETAILS ||| | |
| | | | DECODE PROGRAM NUMBER | TIME LIMIT INFORMATION | USE NUMBER INFORMATION | | |
| U1234 | S0011 | R2345 | 1 | 2001/1/1 — 2001/12/31 | — | --- | ----- |
| | | | 2 | — | 30 | | |
| | | | 3 | — | — | | |
| | | | 4 | 2001/3/1 — 2001/3/31 | 40 | | |
| --- | --- | --- | | | | --- | ----- |
| --- | --- | --- | | | | --- | ----- |

FIG. 6

| USE | BIT LENGTH | DEFINITION |
|---|---|---|
| ID | 1 | 1 : MPEG-1/Audio<br>0 : UNDEFINED |
| LAYER | 2 | 11 : LAYER I    10 : LAYER II<br>01 : LAYER III   00 : UNDEFINED |
| PROTECTION BIT | 1 | 1 : ERROR DETECTION CORRECTION<br>    INFORMATION NOT ADDED<br>0 : ERROR DETECTION CORRECTION<br>    INFORMATION ADDED |
| BIT RATE | 4 | INDEX DEFINING BIT RATE |
| SAMPLING FREQUENCY | 2 | 11 : Reserved    10 : 32 kHz<br>01 : 48 kHz      00 : 44.1 kHz |
| PADDING BIT | 1 | 1 : FRAME INCLUDING EXCESS SLOT<br>0 : FRAME INCLUDING NO EXCESS SLOT |
| PRIVATE BIT | 1 | NOT USED BY ISO/IEC |
| MODE | 2 | 00 : STEREO<br>01 : JOINT STEREO<br>10 : DUAL CHANNEL<br>11 : SINGLE CHANNEL |
| MODE EXTENSION | 2 | SUBBAND PERFORMING JOINT STEREO IN LAYER I/II, AND COMBINATION OF INTENSITY STEREO AND MS STEREO IN LAYER III |
| COPYRIGHT | 1 | 1 : COPYRIGHTED<br>0 : NOT COPYRIGHTED |
| ORIGINAL OR COPY | 1 | 1 : ORIGINAL<br>0 : COPY |
| ENPHASIS | 2 | DEFINE TYPE OF EMPHASIS TO BE USED |

EXTENSION INSTRUCTION COUNTER EIC

DISTRIBUTION SYSTEM

This application is based on an application No. 2000-258534 filed in Japan, the content of which is hereby incorporated by reference.

BACKGROUND OF THE INVENTION

1. Field of the Invention

The present invention relates to a signal processing technique for decoding a compression-encoded signal to an original signal, and to a technique for distributing a program used for decoding.

2. Related Art

In recent years, copyrighted articles such as music and movie films are recorded on optical disks such as DVDs and put to use.

An AV (Audio/Video) signal recorded on an optical disk has been compression-encoded so as to reserve a predetermined reproduction period within a limited memory capacity. Therefore, to reproduce the signal, decoding is needed to recover the original signal from the compression-encoded signal.

A conventional signal processing device for decoding a compression-encoded signal is explained below. The signal processing device includes a first input terminal, a second input terminal, a detecting unit, a procedure storing unit, a decoding unit, and an output terminal. The compression-encoded signal is input in the first input terminal, whereas a signal relating to an attribute of the compression-encoded signal, namely, a signal relating to a compression-encode format used for the compression-encoded signal, is input in the second input terminal. When the signal relating to the attribute is input in the second input terminal, the detecting unit specifies the compression-encode format used for the compression-encoded signal, and notifies the procedure storing unit of the compression-encode format. The procedure storing unit stores a plurality of decode procedures (programs) which each correspond to a different compression-encode format. When the compression-encoded signal is input in the first input terminal, the decoding unit decodes the compression-encoded signal in accordance with a decode procedure corresponding to the notified compression-encode format, to recover the original signal. The decoded signal is then output to an external device via the output terminal. Here, the procedure storing unit and the decoding unit are typically implemented on a single LSI decoder. Decode procedures corresponding to various compression-encode formats are stored in the procedure storing unit, and one of these decode procedures is selected based on the detection result by the detecting unit. The selected decode procedure is usually executed by software.

Recently, many different compression-encode formats have been employed to encode audio data, and as a result the variety of decode procedures (audio codecs) for decoding encoded audio data is on the increase. Examples of such decode procedures are AAC (Advanced Audio Compression), MP3 (MPEG Audio Layer 3), and WMA (Windows Media Audio). If all such audio codecs are stored in the procedure storing unit so as to support all available compression-encode formats, the circuit scale and cost of the decoder will increase. Besides, the user who buys the signal processing device may not need some of these audio codecs.

SUMMARY OF THE INVENTION

To solve the above problem, the present invention aims to provide a distribution system, distribution server device, acquisition device, memory medium, audio reproduction device, distribution method, distribution server method, acquisition method, audio reproduction method, distribution program, distribution server program, acquisition program, audio reproduction program, and recording media recording the above programs that can respond to the various needs of users, at reasonable cost.

The stated object can be achieved by a distribution system that distributes a program for decoding encoded audio data, including: a distribution server device which sends the program; a removable memory unit which has an area for storing one or more programs; an acquisition device which, being connected to the distribution server device via a network and loaded with the removable memory unit, acquires the program from the distribution server device and stores the program into the removable memory unit; and an audio reproduction device which, being loaded with the removable memory unit storing the program, decodes the encoded audio data using the program, and outputs sounds.

According to this construction, the user acquires only a decode program which he or she needs, and executes it in the audio reproduction device. Accordingly, decode programs unnecessary for the user do not need to be stored in the audio reproduction device. This enables an audio reproduction device that can respond to the various needs of users, to be provided at reasonable cost.

Here, the removable memory unit may store one or more programs which are each used for decoding encoded audio data of a different type, wherein the audio reproduction device stores a detection module beforehand, the detection module being a program module used for detecting a type of the encoded audio data, and the audio reproduction device detects the type of the encoded audio data using the detection module, reads the program for decoding encoded audio data of the detected type from the removable memory unit, and decodes the encoded audio data using the read program.

According to this construction, the audio reproduction device detects the decode program by using the detection module. Therefore, encoded audio data can be properly decoded regardless of which of different compression-encode formats was used for generating the encoded audio data.

Here, the distribution server device may send permission information which indicates that the program is permitted to use, in correspondence with the program, wherein the acquisition device acquires the permission information, and stores the permission information into the removable memory unit in correspondence with the program, and the audio reproduction device decodes the encoded audio data using the program, only when the permission information corresponding to the program is stored in the removable memory unit.

According to this construction, the audio reproduction device can use the program only when the permission information corresponding to the program is stored in the removable memory unit. This has the effect of preventing unauthorized use of the program.

Here, the distribution system may further distribute maintenance information for updating the program, wherein the acquisition device reads the user identifier from the removable memory unit, and sends the user identifier to the distribution server device, the distribution server device (a) stores the maintenance information beforehand in correspondence with the program, (b) receives the user identifier, (c) judges whether the received user identifier matches the user identifier stored in the distribution server device, and (d) sends the maintenance information if the two user identifiers are judged as matching, and the acquisition device acquires the maintenance information, and updates the program stored in the removable memory unit using the acquired maintenance information.

According to this construction, the maintenance information is sent only to registered users, with it being possible to provide various services for the users.

Here, the distribution server device may send an alternative detection module that is a program module used, instead of the detection module stored in the audio reproduction device, for detecting the type of the encoded audio data, wherein the acquisition device acquires the alternative detection module from the distribution server device, and stores the alternative detection module into the removable memory unit, and the audio reproduction device reads the alternative detection module from the removable memory unit, and detects the type of the encoded audio data using the alternative detection module instead of the detection module.

According to this construction, the audio reproduction device detects the decode program by using the received detection module. Therefore, even when a new compression-encode format is developed and used for encoding audio data, a decode program corresponding to the new compression-encode format can be detected by updating the detection module.

The stated object can also be achieved by an audio reproduction device for decoding encoded audio data and outputting sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program into the removable memory unit, and the removable memory unit storing the program is loaded to the audio reproduction device, the audio reproduction device including: a reading unit operable to read the program from the removable memory unit; a decoding unit operable to decode the encoded audio data using the program, to generate audio data; and a sound outputting unit operable to convert the audio data to the sounds and output the sounds.

According to this construction, the user decodes the encoded audio data using the program acquired from the distribution server device. This enables an audio reproduction device to be provided at reasonable cost.

Here, the program may be made up of subprograms, wherein the audio reproduction device further includes: a subprogram storage area which is used for storing a subprogram; and a loading unit operable to write the subprograms in sequence into the subprogram storage area, and the decoding unit decodes the encoded audio data using the subprograms written in the subprogram storage area. Also, the program may be made up of subprograms, wherein the audio reproduction device further includes: two subprogram storage areas which are each used for storing a subprogram; and a loading unit operable to write the subprograms in sequence into the two subprogram storage areas alternately, and the decoding unit decodes the encoded audio data, alternately using the subprograms written in the two subprogram storage areas.

According to this construction, the audio reproduction device can execute the decode program even if it has only a memory area of small capacity. This allows the circuit scale and cost of the audio reproduction device to be reduced.

Here, the removable memory unit may store a unique program beforehand, instead of the program, wherein the audio reproduction device further includes: a ROM storing unit which is made of a read-only semiconductor memory and stores a common subprogram beforehand, the program being made up of the unique subprogram and the common subprogram; a RAM storing unit which is made of a readable and rewritable semiconductor memory, and has an area for storing the unique subprogram; and a loading unit operable to read the unique subprogram from the removable memory unit, and write the unique subprogram into the RAM storing unit, and the decoding unit decodes the encoded audio data, using the common subprogram and the unique subprogram which are respectively stored in the ROM storing unit and the RAM storing unit.

According to this construction, the common subprogram is stored in the ROM area beforehand, whereas the unique subprogram is loaded into the RAM area when necessary. The encoded audio data is decoded using these subprograms stored in the ROM and RAM areas, with it being possible to reduce the amount of program data which need be acquired from outside.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 3 shows a data structure of a decode program table shown in FIG. 2;

FIG. 5 shows a data structure of a customer information table shown in FIG. 2;

FIG. 6 shows an example of a header unit of encoded audio data;

DESCRIPTION OF THE PREFERRED EMBODIMENT

The following describes a distribution system 1 as an embodiment of the invention.

Figure 1:
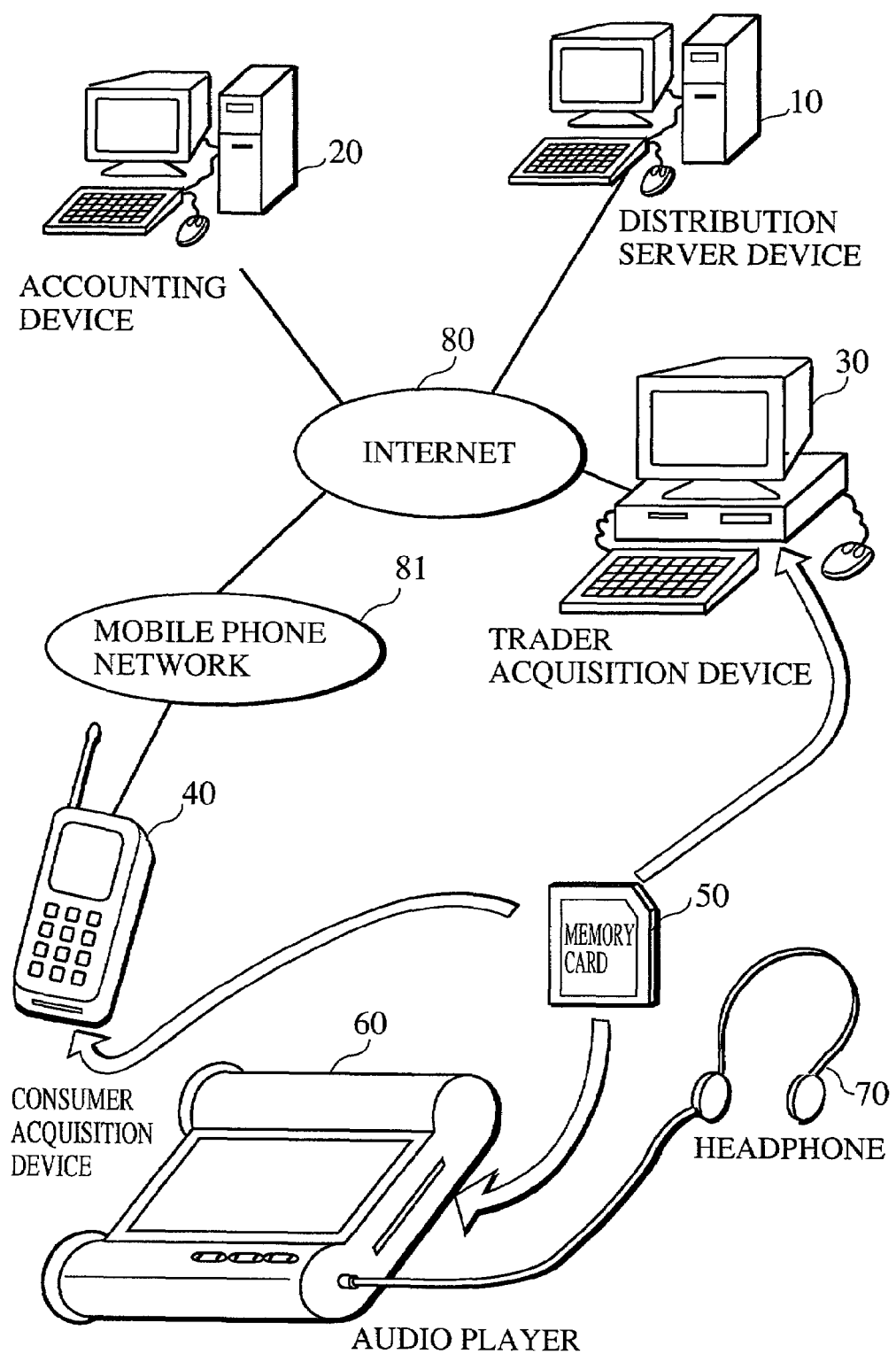
FIG. 1 is a block diagram showing a construction of a distribution system to which an embodiment of the invention relates.

The distribution system 1 is roughly made up of a distribution server device 10, an accounting device 20, a trader acquisition device 30, a consumer acquisition device 40, a memory card 50, an audio player 60, and a headphone 70, as shown in FIG. 1.

The distribution server device 10, the accounting device 20, and the trader acquisition device 30 are connected to the Internet 80. The consumer acquisition device 40 is connected to the Internet 80 via a mobile phone network 81.

The distribution server device 10 is possessed by a distributor that distributes programs. The distribution server device 10 sends a program for decoding encoded audio data, to the trader acquisition device 30 via the Internet 80, or to the consumer acquisition device 40 via the Internet 80 and the mobile phone network 81.

The trader acquisition device 30 is possessed by a trader that provides programs to the end user. The user of the audio player 60 brings the memory card 50 to the trader, and the memory card 50 is loaded to the trader acquisition device 30. The trader acquisition device 30 receives the program from the distribution server device 10 via the Internet 80, and writes it to the memory card 50. When the trader acquisition device 30 writes the program to the memory card 50, the user pays to the trader.

The consumer acquisition device 40 is a mobile phone possessed by the user. The memory card 50 is loaded to the consumer acquisition device 40. The consumer acquisition device 40 receives the program from the distribution server device 10 via the Internet 80 and the mobile phone network 81, and writes it to the memory card 50. When the consumer acquisition device 40 writes the program to the memory card 50, the user pays to the accounting device 20 via the mobile phone network 81 and the Internet 80, through the use of the consumer acquisition device 40.

The audio player 60 is possessed by the user. The user loads the memory card 50 on which the program has been written, to the audio player 60. The audio player 60 reads the program from the memory card 50, decodes the encoded audio data using the read program, and outputs an audio signal to the headphone 70.

Thus, the user enjoys playing back audio data of music and the like.

1. Construction of the Distribution Server Device 10

Figure 2:
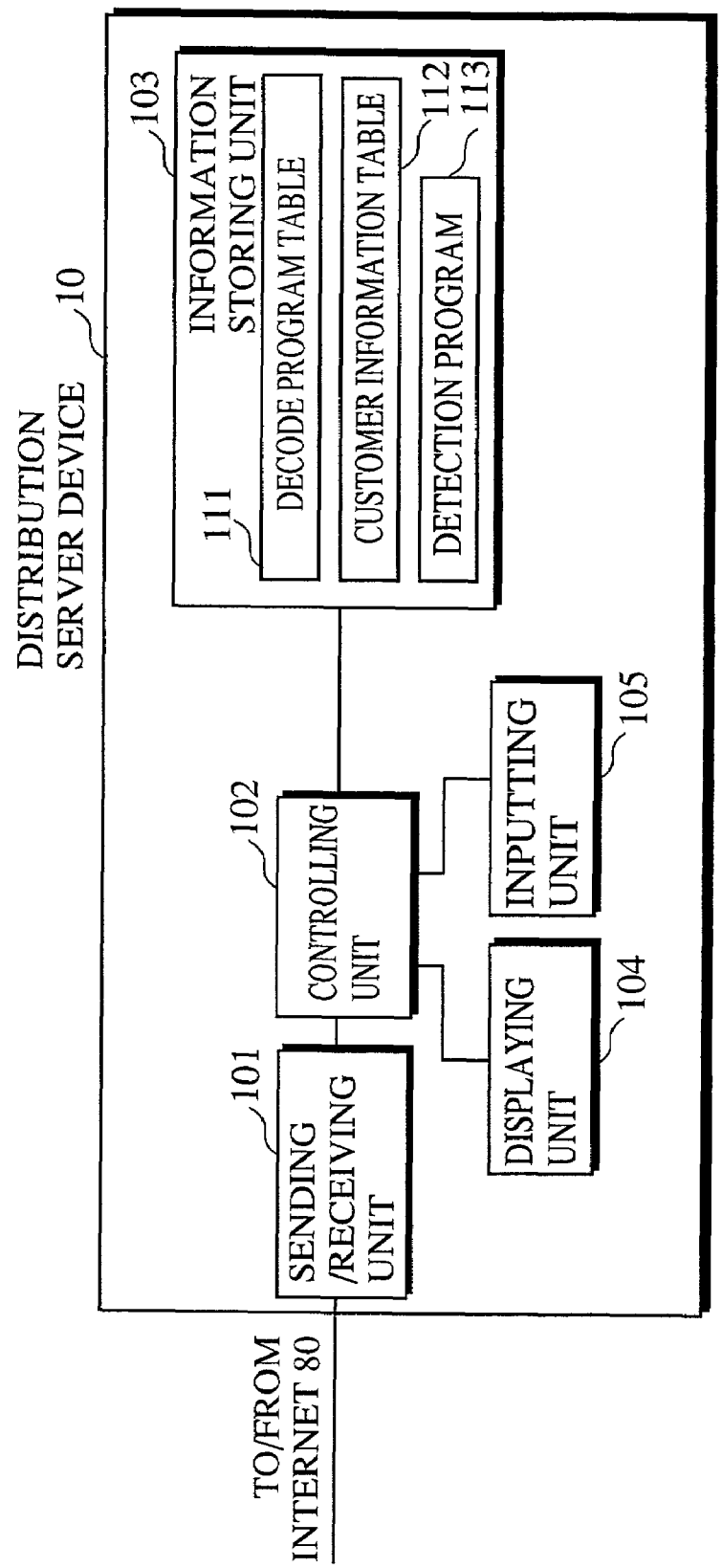
FIG. 2 is a block diagram showing a construction of a distribution server device shown in FIG. 1.

The distribution server device 10 includes a sending/receiving unit 101, a controlling unit 102, an information storing unit 103, a displaying unit 104, and an inputting unit 105, as shown in FIG. 2.

The distribution server device 10 is implemented as a computer system made up of a microprocessor, a ROM, a RAM, a hard disk unit, a display unit, a keyboard, a mouse, a communication unit, and the like. Computer programs are stored in the RAM or the hard disk unit. The microprocessor operates according to the computer programs, thereby realizing the functions of the distribution server device 10.

(1) Information Storing Unit 103

The information storing unit 103 is implemented by the hard disk unit or the like. The information storing unit 103 stores a decode program table 111, a customer information table 112, and a detection program 113.

(Decode Program Table 111)

As shown in FIG. 3, the decode program table 111 is a data table which contains a plurality of sets of program information that are each made up of a decode program number, a decode program name, an authentication code, a decode program, a provision category, use condition setting information, fee information, maintenance information presence information, and maintenance information. These sets of program information are in a one-to-one correspondence with decode programs.

The decode program number is an identifier for uniquely identifying the decode program.

The decode program name is a name for identifying the decode program.

The decode program is a computer program that contains a plurality of decode instructions for decoding audio data of music or the like which has been encoded under a specific standard.

The provision category indicates whether the decode program is provided to the user on a chargeable basis or free of charge. The provision category shows either "chargeable" or "free".

The use condition setting information is made up of time limit setting information and use number setting information.

When the provision category is "chargeable", the time limit setting information shows whether a period during which the decode program is permitted to use can be set. If "settable", the time limit setting information indicates that the period for the use of the decode program can be set. If "not settable", the time limit setting information indicates that the period cannot be set. When the provision category is "free", the time limit setting information shows a period during which the decode program is permitted to use free of charge.

When the provision category is "chargeable", the use number setting information shows whether the number of times the decode program is permitted to use can be set. If "settable", the use number setting information indicates that the number of uses of the decode program can be set. If "not settable", the use number setting information indicates that the number of uses of the decode program cannot be set. When the provision category is "free", the use number setting information shows the number of times the decode program is permitted to use free of charge.

The fee information shows a fee which is charged to the user for the provision of the decode program, when the provision category is "chargeable". As illustrated, the fee information shows a fee for a period, a fee for a use, or a fee which does not depend on periods or number of uses.

The maintenance information presence information shows whether maintenance information concerning amendments of the decode program exists. If "present", the maintenance information presence information indicates that the maintenance information exists. If "absent", the maintenance information presence information indicates that the maintenance information does not exist.

The maintenance information is an amendment program for amending the decode program.

(Decode Program)

Figure 4:
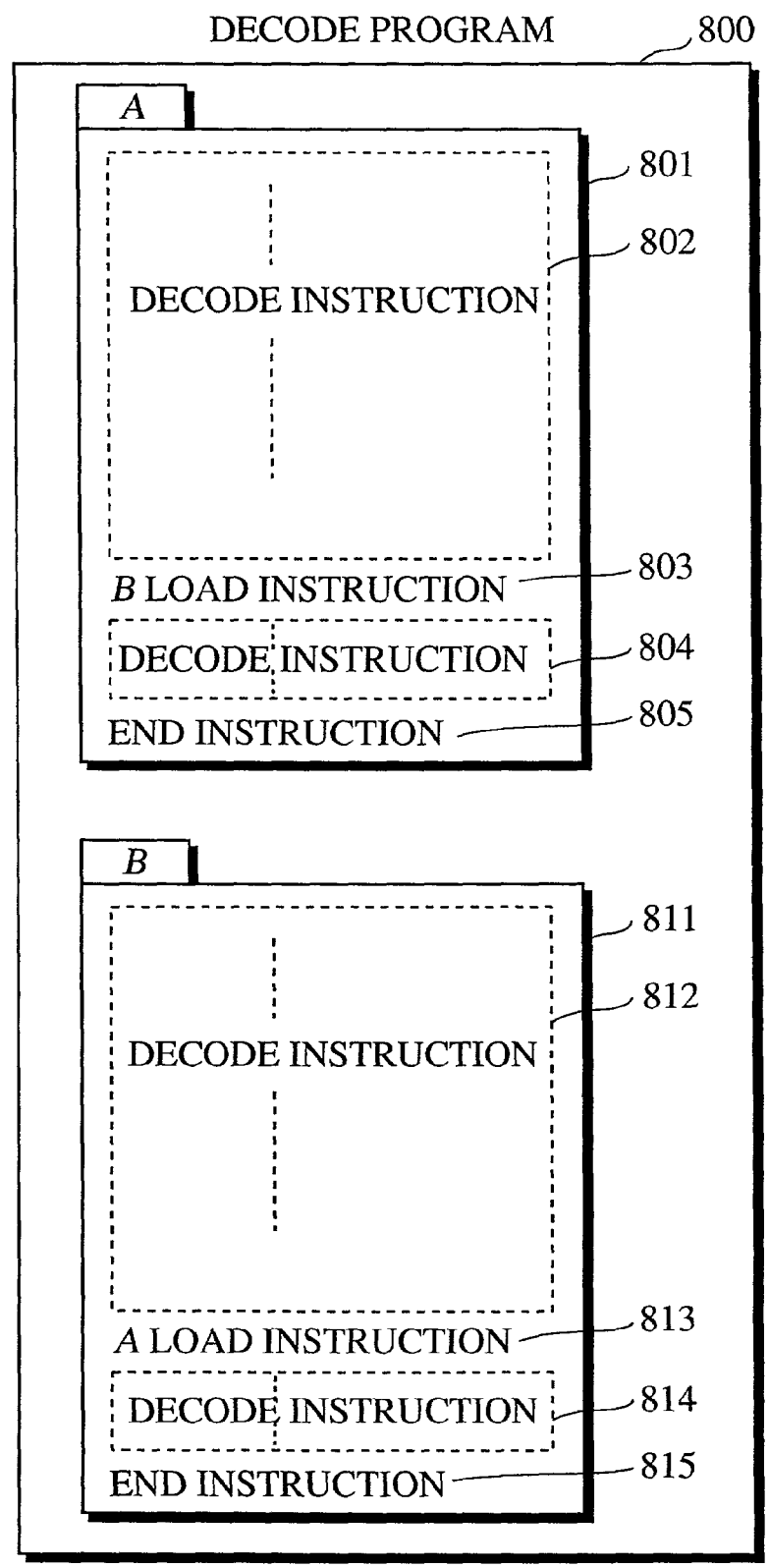
FIG. 4 shows an example of a decode program.

An example of the decode program is shown in FIG. 4. A decode program 800 shown in the drawing is composed of subprogram A 801 and subprogram B 811.

The decode program 800 is, for example, a program for decoding audio data which has been encoded by MP3. Subprogram A 801 is a program for decoding Huffman codes, whilst subprogram B 811 is a program for executing inverse conversion of MDCT (Modified Discrete Cosine Transformation). MP3, Huffman codes, and MDCT are known techniques, so that their explanation has been omitted.

By executing subprogram A 801 and subprogram B 811 in this order, a block of encoded audio data is decoded.

Subprogram A 801 includes a plurality of decode instructions 802, a B load instruction 803, a plurality of decode instructions 804, and an end instruction 805, as shown in the drawing. The decode instructions 802 and 804 form a program for decoding Huffman codes. The B load instruction 803 is an instruction to read subprogram B 811. The B load instruction 803 is located at a specific position in subprogram A 801. As an example, the specific position is 50 μsec before the end of subprogram A 801. By providing a load instruction at such a position, loading a subprogram and executing a subprogram complete more or less simultaneously. Here, the position 50 μsec before the end of the subprogram is determined by actual measurement. The end instruction 805 is an instruction to end subprogram A 801. The instructions which make up subprogram A 801 are executed in the order of description in the subprogram.

Subprogram B 811 has the same data structure as subprogram A 801, and includes a plurality of decode instructions 812, an A load instruction 813, a plurality of decode instructions 814, and an end instruction 815. The decode instructions 812 and 814 form a program for executing inverse conversion of MDCT. The A load instruction 813 is an instruction to read subprogram A 801. The A load instruction 813 is located at the aforementioned specific position in subprogram B 811. The end instruction 815 is an instruction to end subprogram B 811. The instructions which make up subprogram B 811 are executed in the order of description in the subprogram.

(Customer Information Table 112)

The customer information table 112 is a data table that contains a plurality of sets of customer information which are each made up of a user ID, a trader ID, a use condition information ID, and use condition details, as shown in FIG. 5.

The user ID is an identifier which uniquely identifies a user.

The trader ID is an identifier which uniquely identifies a trader.

The use condition information ID is an identifier which identifies a plurality of sets of use condition information.

The use condition details show the details of the use condition of each decode program for the user identified by the user ID. The use condition details contain a plurality of sets of use condition information which are each made up of a decode program number, time limit information, and use number information, as shown in the drawing. The decode program number is an identifier identifying a decode program, as explained above. The time limit information shows a time limit during which the decode program identified by the decode program number is permitted to use. The use number information shows the number of times the decode program is permitted to use.

(Detection Program 113)

The detection program 113 is a program for specifying a decode program used for generating encoded audio data which the user wants to play back, by detecting a decode format of the encoded audio data.

When judging decode programs of the same codec standard such as MPEG Audio, the detection program 113 uses information stored in a header unit of encoded audio data, in the following manner. When judging decode programs of different codec standard such as AC3 and MPEG Audio, the detection program 113 uses a sync pattern.

Information for specifying a decode program used when generating encoded audio data is included at a predetermined position in the encoded audio data.

FIG. 6 shows an example of a header unit of encoded audio data. As illustrated, the header unit includes an ID, a layer, a protection bit, and the like, from the top.

For instance, when the first bit is "1" and the second and third bits are "01", MP3 is specified.

Thus, the header unit stores information that differs depending on which decode program is used. Hence the type of the decode program can be specified by referring to the header unit.

The detection program 113 judges the contents of information included in the header unit, to specify the decode program necessary for the encoded audio data. An example of the decode program will be described in details later.

(2) Controlling Unit 102

(Sending a Decode Program to the Trader Acquisition Device 30)

The controlling unit 102 receives a decode program number, time limit information, use number information, and a trader ID from the trader acquisition device 30 via the Internet 80 and the sending/receiving unit 101.

Upon receiving these information, the controlling unit 102 generates a user ID for identifying the user.

The controlling unit 102 then extracts program information including the received decode program number, from the decode program table 111. The controlling unit 102 calculates a fee to be charged to the user, using fee information included in the extracted program information and the received time limit information and use number information, according to the following equation:

Fee=(the fee shown by the fee information) ×(the time limit shown by the time limit information or the number shown by the use number information)

The controlling unit 102 generates use condition information which is made up of the received decode program number, an authentication code included in the extracted program information, the received time limit information, and the received use number information.

Following this, the controlling unit 102 sends fee information showing the calculated fee, the generated use condition information, and the generated user ID, to the trader acquisition device 30 via the sending/receiving unit 101 and the Internet 80.

The controlling unit 102 also sends the decode program number, a decode program name and decode program included in the extracted program information, and the detection program 113, to the trader acquisition device 30 via the sending/receiving unit 101 and the Internet 80.

Next, the controlling unit 102 generates a use condition information ID identifying the generated use condition information, and writes customer information made up of the generated user ID, the received trader ID, the generated use condition information ID, and the generated use condition information, to the customer information table 112.

(Sending a Chargeable Decode Program to the Consumer Acquisition Device 40)

The controlling unit 102 receives a decode program number, time limit information, and use number information from the consumer acquisition device 40, via the mobile phone network 81, the Internet 80, and the sending/receiving unit 101.

Upon receiving these information, the controlling unit 102 generates a user ID and calculates a fee, in the same way as above. The controlling unit 102 then sends the generated user ID and fee information showing the calculated fee, to the consumer acquisition device 40 via the sending/receiving unit 101, the Internet 80, and the mobile phone network 81. The controlling unit 102 also sends the user ID and the fee information to the accounting device 20 via the sending/receiving unit 101 and the Internet 80.

The controlling unit 102 receives confirmation information to confirm the user's payment, from the accounting device 20 via the Internet 80 and the sending/receiving unit 101. Upon receiving the confirmation information, the controlling unit 102 generates use condition information in the same way as above, and sends the use condition information to the consumer acquisition device 40 via the sending/receiving unit 101, the Internet 80, and the mobile phone network 81.

After this, the controlling unit 102 extracts program information that includes the received decode program number, from the decode program table 111. The controlling unit 102 sends the decode program number, a decode program name and decode program included in the extracted program information, and the detection program 113, to the consumer acquisition device 40 via the sending/receiving unit 101, the Internet 80, and the mobile phone network 81.

The controlling unit 102 also generates customer information and writes it to the customer information table 112, as described above.

(Sending a Free Decode Program to the Consumer Acquisition Device 40)

The controlling unit 102 receives a decode program number from the consumer acquisition device 40, through the mobile phone network 81, the Internet 80, and the sending/receiving unit 101.

The controlling unit 102 then generates a user ID, and extracts program information that includes the decode program number from the decode program table 111, as described above. Based on use condition setting information in the extracted program information, the controlling unit 102 generates use condition information, and sends the user ID and the use condition information to the consumer acquisition device 40 through the sending/receiving unit 101, the Internet 80, and the mobile phone network 81.

Next, the controlling unit 102 sends the decode program number, a decode program name and decode program in the extracted program information, and the detection program 113, to the consumer acquisition device 40 via the sending/receiving unit 101, the Internet 80, and the mobile phone network 81.

(Sending Maintenance Information to the Consumer Acquisition Device 40)

The controlling unit 102 receives a user ID and a use condition information ID from the consumer acquisition device 40, via the mobile phone network 81, the Internet 80, and the sending/receiving unit 101.

Upon receiving the user ID and the use condition information ID, the controlling unit 102 judges whether the user ID and the use condition information ID exist in the customer information table 112. If not, the controlling unit 102 sends an error message indicating such, to the consumer acquisition device 40 via the sending/receiving unit 101, the Internet 80, and the mobile phone network 81.

If the user ID and the use condition information ID are found in the customer information table 112, the controlling unit 102 extracts all decode program numbers corresponding to the user ID and the use condition information ID, from the customer information table 112. The controlling unit 102 then extracts program information having the extracted decode program numbers, from the decode program table 111. If maintenance information presence information included in the extracted program information shows "present", the controlling unit 102 sends maintenance information included in the extracted program information, to the consumer acquisition device 40 via the sending/receiving unit 101, the Internet 80, and the mobile phone network 81.

(3) Sending/Receiving Unit 101

The sending/receiving unit 101 transfers information between the controlling unit 102 and the accounting device 20, the trader acquisition device 30, or the consumer acquisition device 40.

(4) Displaying Unit 104 and Inputting Unit 105

The displaying unit 104 and the inputting unit 105 are implemented by the display unit, the keyboard, the mouse, and the like. The displaying unit 104 and the inputting unit 105 display information, and accept operations from a manager of the distribution server device 10.

2. Trader Acquisition Device 30

Figure 7:
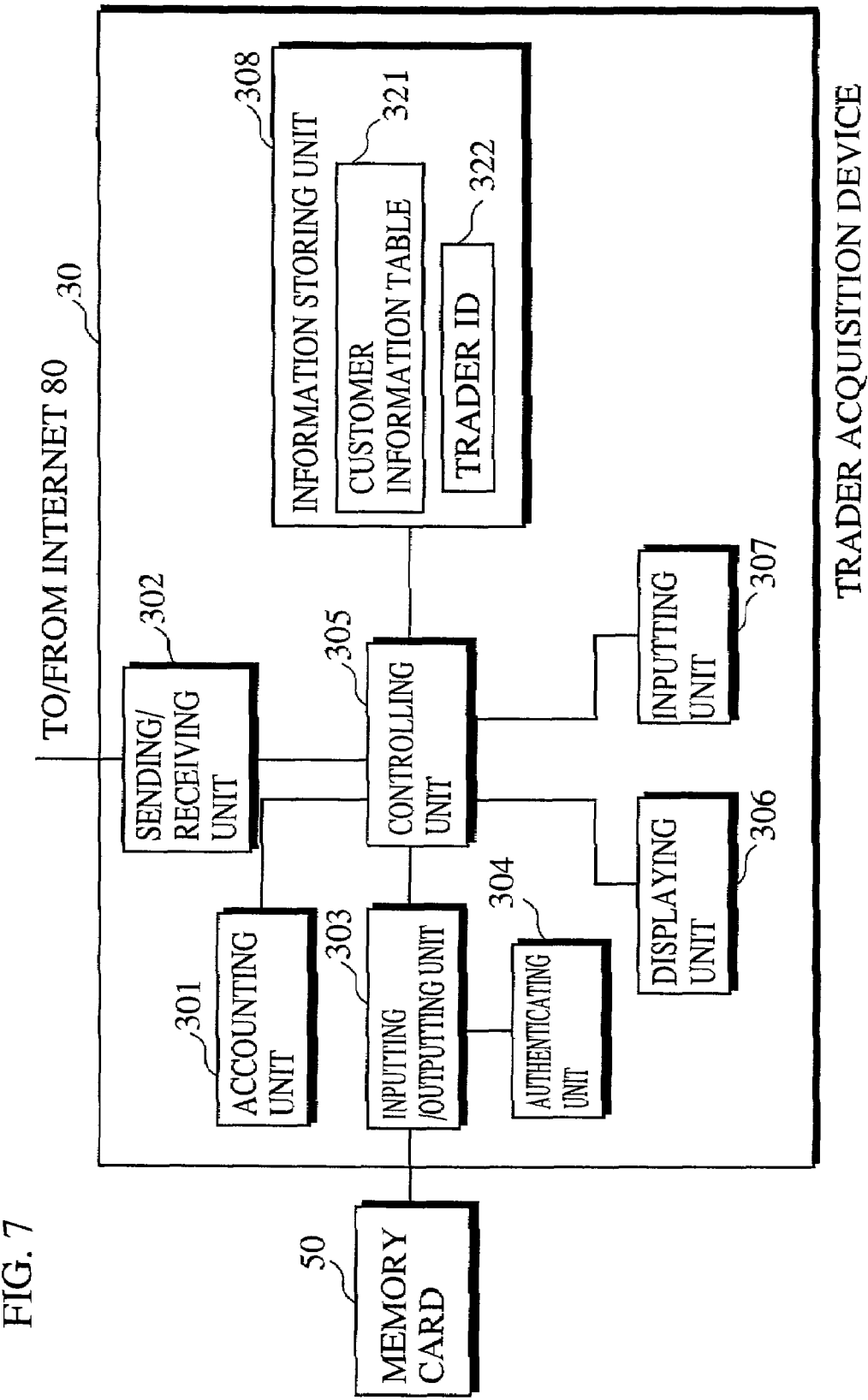
FIG. 7 is a block diagram showing a construction of a trader acquisition device shown in FIG. 1.

The trader acquisition device 30 includes an accounting unit 301, a sending/receiving unit 302, an inputting/outputting unit 303, an authenticating unit 304, a controlling unit 305, a displaying unit 306, an inputting unit 307, and an information storing unit 308, as shown in FIG. 7.

The trader acquisition device 30 is implemented as a computer system made up of a microprocessor, a ROM, a RAM, a hard disk unit, a display unit, a keyboard, a mouse, a communication unit, and the like. Computer programs are stored in the RAM or the hard disk unit. The microprocessor operates according to the computer programs, thereby realizing the functions of the trader acquisition device 30.

(1) Information Storing Unit 308

The information storing unit 308 is implemented by the hard disk unit. A customer information table 321 and a trader ID 322 are stored in the information storing unit 308, as shown in FIG. 7.

The customer information table 321 has the same data structure as the customer information table 112 stored in the information storing unit 103 in the distribution server device 10.

The trader ID 322 is an identifier which identifies the trader that possesses the trader acquisition device 30.

(2) Inputting Unit 307

The inputting unit 307 is implemented by the keyboard, the mouse, or similar. The inputting unit 307 accepts input of a decode program number of a decode program desired by the user, time limit information, and use number information, from a manager of the trader acquisition device 30. The inputting unit 307 then outputs the decode program number, the time limit information, and the use number information to the controlling unit 305.

(3) Controlling Unit 305

The controlling unit 305 controls the authenticating unit 304 to perform mutual device authentication with the memory card 50.

Once the mutual authentication has succeeded, the controlling unit 305 operates as follows.

The controlling unit 305 receives a decode program number, time limit information, and use number information from the inputting unit 307.

The controlling unit 305 then reads the trader ID 322 from the information storing unit 308, and sends the received decode program number, time limit information, use number information, and the read trader ID 322 to the distribution server device 10 via the sending/receiving unit 302 and the Internet 80.

The controlling unit 305 receives fee information, use condition information, and a user ID from the distribution server device 10 via the Internet 80 and the sending/receiving unit 302. The controlling unit 305 also receives the decode program number, a decode program name, a decode program, and a detection program from the distribution server device 10.

Upon receiving the fee information, the use condition information, and the user ID, the controlling unit 305 performs accounting based on the received fee information.

The controlling unit 305 then writes the use condition information to a use condition information table 522 in a secure area of the memory card 50, through the inputting/outputting unit 303.

The controlling unit 305 also writes the decode program number, the decode program name, and the decode program to a general area of the memory card 50, through the inputting/outputting unit 303.

The controlling unit 305 further writes the detection program to the general area of the memory card 50, through the inputting/outputting unit 303.

(4) Inputting/outputting Unit 303

The inputting/outputting unit 303 reads/writes information from/to the memory card 50.

(5) Authenticating Unit 304

The authenticating unit 304 performs device authentication of the challenge and response format with the memory card 50, under control of the controlling unit 305. The authenticating unit 304 then notifies the controlling unit 305 of the authentication outcome.

(6) Accounting Unit 301

The accounting unit 301 receives a payment from the user.

(7) Displaying Unit 306

The displaying unit 306 is implemented by the display unit or the like, and displays information.

(8) Sending/Receiving Unit 302

The sending/receiving unit 302 transfers information between the controlling unit 305 and the distribution server device 10.

3. Consumer Acquisition Device 40

Figure 8:
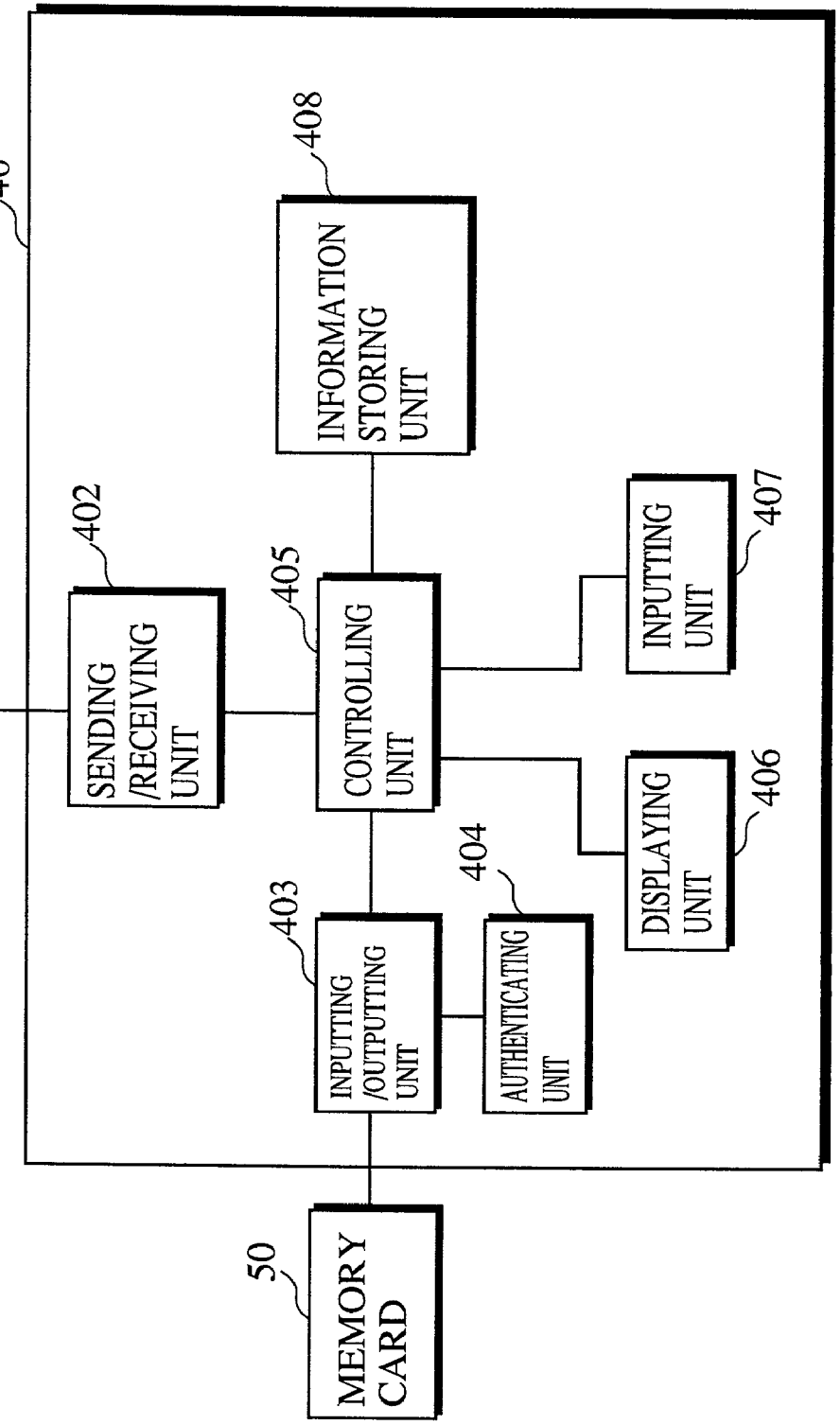
FIG. 8 is a block diagram showing a construction of a consumer acquisition device shown in FIG. 1.

The consumer acquisition device 40 includes a sending/receiving unit 402, an inputting/outputting unit 403, an authenticating unit 404, a controlling unit 405, a displaying unit 406, an inputting unit 407, and an information storing unit 408, as shown in FIG. 8.

The consumer acquisition device 40 is a transportable mobile phone that is capable of performing mobile communication using radio waves. To be more specific, the consumer acquisition device 40 is implemented by a computer system made up of a microprocessor, a ROM, a RAM, a liquid crystal display unit, a key operation unit, a communicating unit, a connection unit, an antenna, and the like. Mobile phone computer programs for communication, key operation, liquid crystal display, and management of various data are stored in the RAM. The microprocessor operates according to the mobile phone computer programs, thereby realizing the functions of the consumer acquisition device 40.

(1) Inputting Unit 407

The inputting unit 407 is implemented by the key operation unit and similar.

To acquire a chargeable decode program, the inputting unit 407 accepts input of a decode program number of a decode program desired by the user, time limit information, and use number information from the user of the consumer acquisition device 40. The inputting unit 407 then outputs the decode program number, the time unit information, and the use number information to the controlling unit 405.

To acquire a free decode program, the inputting unit 407 accepts input of a decode program number of a decode program desired by the user, from the user of the consumer acquisition device 40. The inputting unit 407 outputs the decode program number to the controlling unit 405.

To acquire maintenance information, the inputting unit 407 accepts input of an instruction to acquire maintenance information, from the user of the consumer acquisition device 40. The inputting unit 407 outputs the instruction to the controlling unit 405.

(2) Controlling Unit 405

The controlling unit 405 controls the authenticating unit 404 to perform mutual device authentication with the memory card 50.

Once the device authentication has succeeded, the controlling unit 405 operates in the following way.

(Receiving a Chargeable Decode program)

The controlling unit 405 receives a decode program number, time limit information, and use number information from the inputting unit 407.

The controlling unit 405 then sends the received decode program number, time limit information, and use number information to the distribution server device 10, via the sending/receiving unit 402, the mobile phone network 81, and the Internet 80.

The controlling unit 405 receives fee information and a user ID from the distribution server device 10, through the Internet 80, the mobile phone network 81, and the sending/receiving unit 402. The controlling unit 405 then generates payment information that includes the received fee information and user ID. The payment information referred to here shows payment of a fee shown by the fee information. The controlling unit 405 sends the payment information to the accounting device 20, through the sending/receiving unit 402, the mobile phone network 81, and the Internet 80.

Next, the controlling unit 405 receives use condition information from the distribution server device 10, via the Internet 80, the mobile phone network 81, and the sending/receiving unit 402. The controlling unit 405 also receives a decode program number, a decode program name, a decode program, and a detection program from the distribution server device 10.

The controlling unit 405 writes the use condition information to the use condition information table 522 in the secure area of the memory card 50, through the inputting/outputting unit 403.

The controlling unit 405 also writes the decode program number, the decode program name, and the decode program to the general area of the memory card 50, through the inputting/outputting unit 403.

The controlling unit 405 further writes the detection program to the general area of the memory card 50, through the inputting/outputting unit 403.

(Receiving a Free Decode Program)

The controlling unit 405 receives a decode program number from the inputting unit 407.

The controlling unit 405 then outputs the decode program number to the distribution server device 10, via the sending/receiving unit 402, the mobile phone network 81, and the Internet 80.

The controlling unit 405 receives use condition information and a user ID from the distribution server device 10, through the Internet 80, the mobile phone network 81, and the sending/receiving unit 402. The controlling unit 405 also receives a decode program number, a decode program name, a decode program, and a detection program from the distribution server device 10.

Following this, the controlling unit 405 writes the use condition information to the use condition information table 522 in the secure area of the memory card 50, through the inputting/outputting unit 403.

The controlling unit 405 also writes the decode program number, the decode program name, and the decode program to the general area of the memory card 50, through the inputting/outputting unit 403.

The controlling unit 405 further writes the detection program to the general area of the memory card 50, through the inputting/outputting unit 403.

(Receiving Maintenance Information)

The controlling unit 403 receives an instruction to acquire maintenance information, from the inputting unit 407.

Upon receiving the instruction, the controlling unit 405 reads the user ID and the use condition information ID from the secure area of the memory card 50, and sends the user ID and the use condition information ID to the distribution server device 10 via the sending/receiving unit 402, the mobile phone network 81, and the Internet 80.

The controlling unit 405 receives an error message indicating that the user ID and the use condition information ID are not registered in the distribution server device 10, from the distribution server device 10 via the Internet 80, the mobile phone network 81, and the sending/receiving unit 402. The controlling unit 405 outputs the error message to the displaying unit 406.

The controlling unit 405 receives maintenance information from the distribution server device 10 via the Internet 80, the mobile phone network 81, and the sending/receiving unit 402, and updates a decode program stored in the memory card 50 using the received maintenance information.

(3) Inputting/Outputting Unit 403

The inputting/outputting unit 403 writes/reads information to/from the memory card 50.

(4) Authenticating Unit 404

The authenticating unit 404 performs device authentication of the challenge and response format with the memory card 50, under control of the controlling unit 405. The authenticating unit 404 notifies the controlling unit 405 of the authentication result.

(5) Displaying Unit 406

The displaying unit 406 is implemented by the liquid crystal display unit or the like. The displaying unit 406 receives the error message from the controlling unit 405, and displays it.

(6) Sending/Receiving Unit 402

The sending/receiving unit 402 transfers information between the controlling unit 405 and the distribution server device 10 or the accounting device 20.

(7) Information Storing Unit 408

The information storing unit 408 stores various information.

4. Memory Card 50

Figure 9:
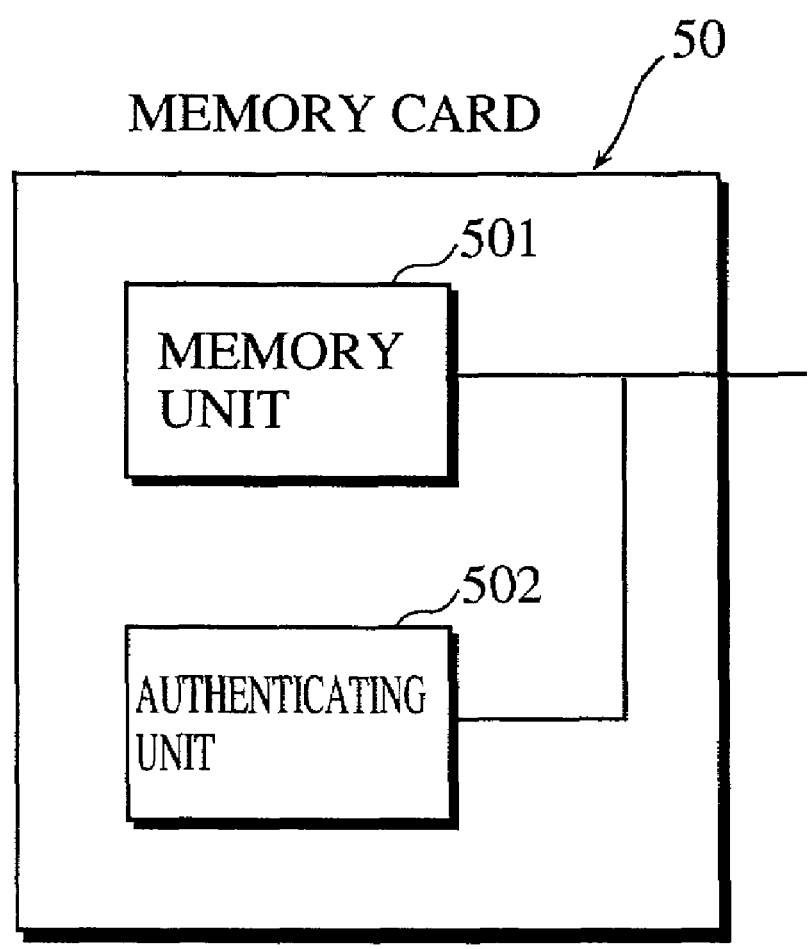
FIG. 9 is a block diagram showing a construction of a memory card shown in FIG. 1.

The memory card 50 is roughly composed of a memory unit 501 and an authenticating unit 502, as shown in FIG. 9.

(1) Authenticating Unit 502

The authenticating unit 502 performs device authentication of the challenge and response format, with a device to which the memory card 50 is loaded.

(2) Memory Unit 501

Figure 10:
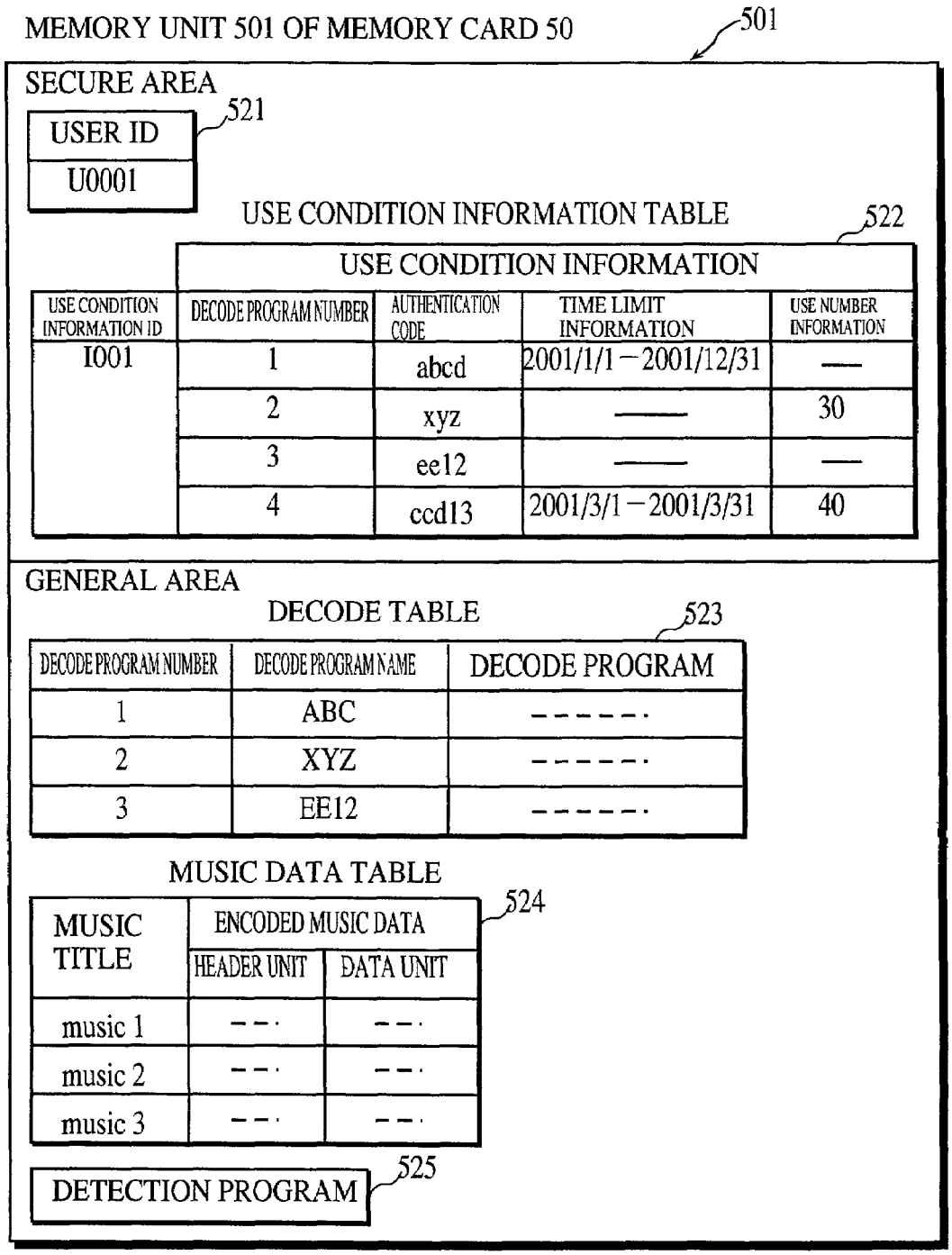
FIG. 10 shows an example of information stored in a memory unit shown in FIG. 9.

The memory unit 501 has a secure area and a general area, as shown in FIG. 10. The secure area is an area which is allowed to access only when the device authentication by the authenticating unit 502 is successful.

(Secure Area)

The secure area has areas for storing a user ID 521 and the use condition information table 522, as shown in FIG. 10.

The user ID 521 is an identifier which uniquely identifies the user.

The use condition information table 522 includes a use condition information ID and a plurality of sets of use condition information.

The use condition information ID is an identifier which uniquely identifies the plurality of sets of use condition information.

Each set of use condition information contains a decode program number, an authentication code, time limit information, and use number information. These information has been described above, so that their explanation is omitted here.

(General Area)

The general area has areas for storing a decode table 523, a music data table 524, and a detection program 525, as shown in FIG. 10.

The decode table 523 has a plurality of combinations of decode program numbers, decode program names, and decode programs. These have been described above, so that their explanation is omitted here.

The music data table 524 includes a plurality of combinations of music titles and encoded music data. A music title is a name for identifying music data. Encoded music data is an encoded form of the music data, and is made up of a header unit and a data unit.

The detection program 525 is as described above.

5. Operations of the Distribution Server Device 10, the Trader Acquisition Device 30, the Consumer Acquisition Device 40, and the Accounting Device 20

Operations of the distribution server device 10, trader acquisition device 30, consumer acquisition device 40, and accounting device 20 are explained below.

(1) Operation of Acquiring a Decode Program by the Trader Acquisition Device 30.

Figure 11:
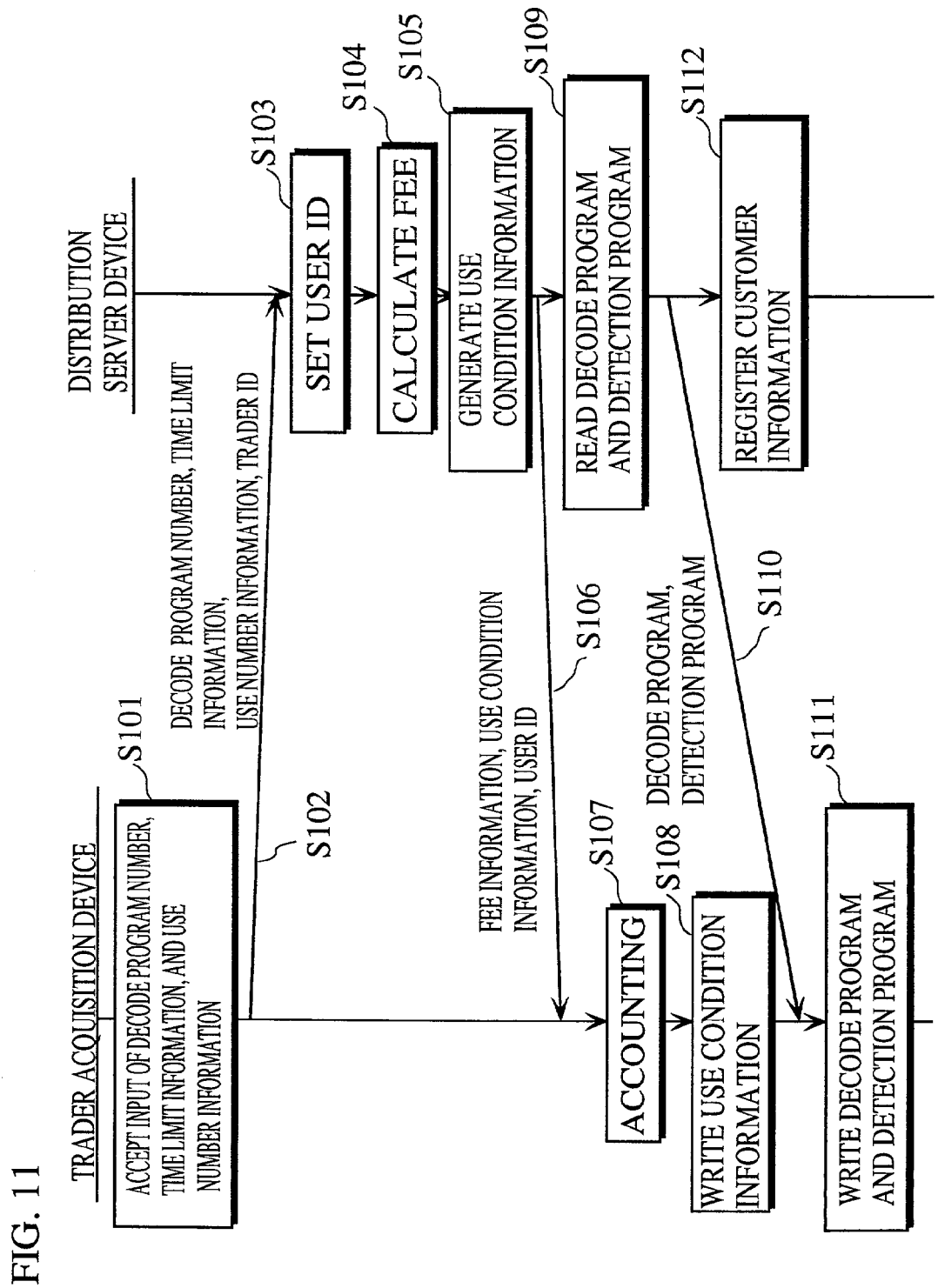
FIG. 11 shows an operation of acquiring a decode program by the trader acquisition device.

An operation of acquiring a decode program by the trader acquisition device 30 is explained with reference to FIG. 11.

The inputting unit 307 accepts input of a decode program number, time limit information, and use number information (S101) The controlling unit 305 sends the decode program number, the time limit information, the use number information, and the trader ID to the distribution server device 10, via the sending/receiving unit 302 and the Internet 80 (S102)

The controlling unit 102 receives the decode program number, the time limit information, the use number information, and the trader ID from the trader acquisition device 30, via the Internet 80 and the sending/receiving unit 101 (S102).

The controlling unit 102 generates a use ID for identifying the user (S103), calculates a fee (S104), generates use condition information, and generates a use condition information ID for identifying the use condition information (S105) The controlling unit 102 sends fee information showing the calculated fee, the use condition information, the use condition information ID, and the user ID, to the trader acquisition device 30 via the sending/receiving unit 101 and the Internet 80 (S106). The controlling unit 102 also extracts program information including the received decode program number from the decode program table 111, and reads a decode program name and decode program from the extracted program information, and the detection program from the information storing unit 103 (S109). The controlling unit 102 sends the decode program number, the decode program name, the decode program, and the detection program to the trader acquisition device 30 via the sending/receiving unit 101 and the Internet 80 (S110).

The controlling unit 102 writes customer information made up of the user ID, the trader ID, the use condition information ID, and the use condition information, to the customer information table 112 (S112).

The controlling unit 305 receives the fee information, the use condition information, the use condition information ID, and the user ID from the distribution server device 10, via the Internet 80 and the sending/receiving unit 302 (S106) The controlling unit 305 performs accounting based on the received fee information (S107). The controlling unit 305 then writes the use condition information to the use condition information table 522 in the secure area of the memory card 50, through the inputting/outputting unit 303 (S108).

The controlling unit 305 also receives the decode program number, the decode program name, the decode program, and the detection program (S110), writes the decode program number, the decode program name, and the decode program to the general area of the memory card 50, and writes the detection program to the general area of the memory card 50, through the inputting/outputting unit 303 (S111).

(2) Operation of Acquiring a Chargeable Decode Program by the Consumer Acquisition Device 40

Figure 12:
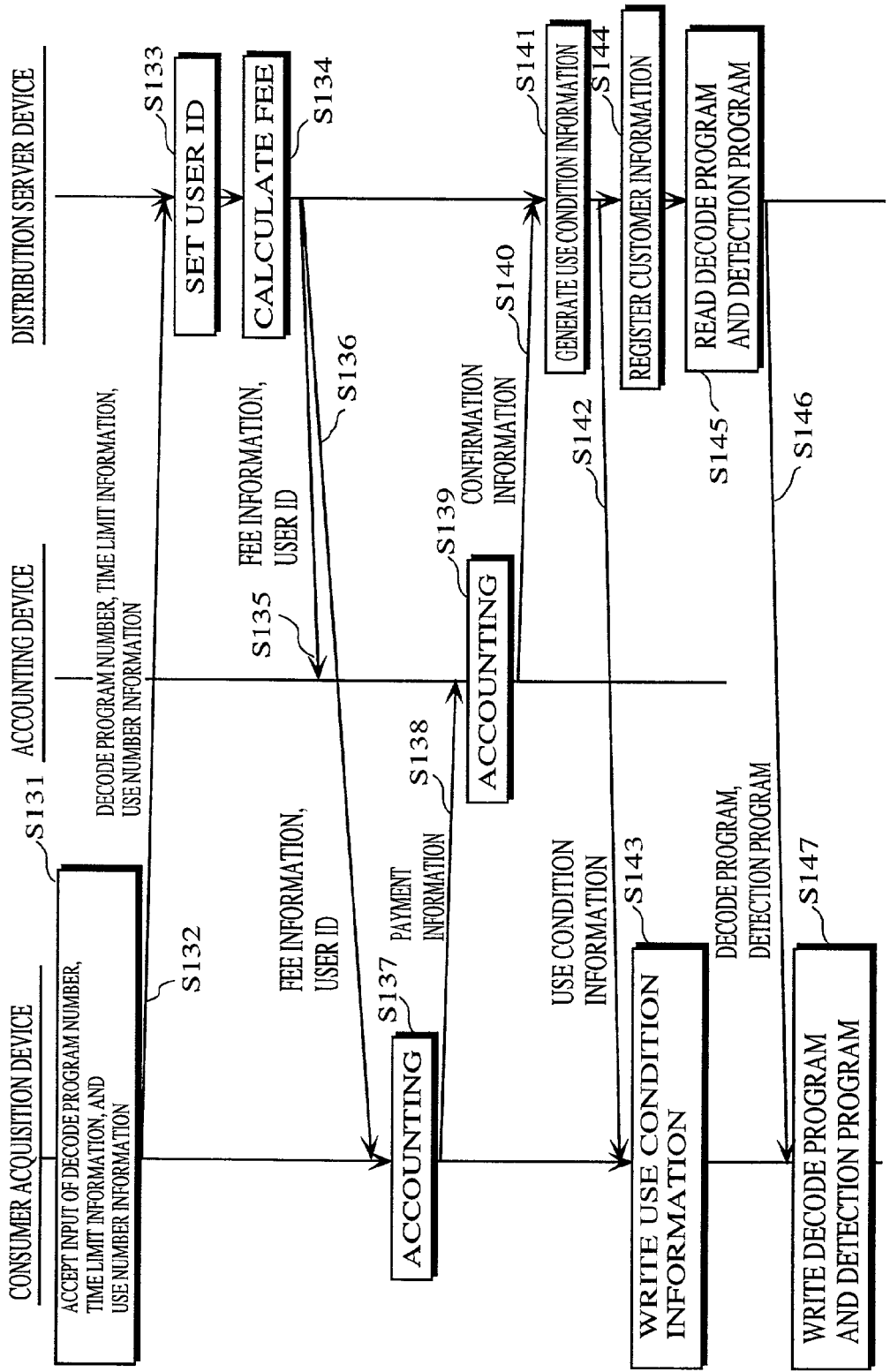
FIG. 12 shows an operation of acquiring a chargeable decode program by the consumer acquisition device.

An operation of acquiring a chargeable decode program by the consumer acquisition device 40 is explained with reference to FIG. 12.

The inputting unit 407 accepts input of a decode program number, time limit information, and use number information (S131). The controlling unit 405 sends the decode program number, the time limit information, and the use number information to the distribution server device 10 via the sending/receiving unit 402, the mobile phone network 81, and the Internet 80 (S132).

The controlling unit 102 receives the decode program number, the time limit information, and the use number information from the consumer acquisition device 40, via the mobile phone network 81, the Internet 80, and the sending/receiving unit 101 (S132).

On receiving the decode program number, the time limit information, and the use number information, the controlling unit 102 generates a user ID (S133), and calculates a fee (S134). The controlling unit 102 sends the use ID and fee information showing the calculated fee, to the accounting device 20 via the sending/receiving unit 101 and the Internet 80 (Sl35) The controlling unit 102 also sends the user ID and the fee information to the consumer acquisition device 40 via the sending/receiving unit 101, the Internet 80, and the mobile phone network 81 (S136).

The controlling unit 405 receives the fee information and the user ID from the distribution server device 10, through the Internet 80, the mobile phone network 81, and the sending/receiving unit 402 (S136) On receiving these information, the controlling unit 405 generates payment information that includes the fee information and the user ID (S137). The controlling unit 405 then sends the payment information to the accounting device 20 via the sending/receiving unit 402, the mobile phone network 81, and the Internet 80 (S138)

The accounting device 20 receives the payment information (S138), and performs accounting (S139). The accounting device 20 then sends confirmation information confirming the user's payment, to the distribution server device 10 via the Internet 80 (S140).

The controlling unit 102 receives the confirmation information via the Internet 80 and the sending/receiving unit 101 (S140). Upon receiving the confirmation information, the controlling unit 102 generates use condition information as described above (S141), and sends the use condition information to the consumer acquisition device 40 via the sending/receiving unit 101, the Internet 80, and the mobile phone network 81 (S142).

The controlling unit 405 receives the use condition information from the distribution server device 10, via the Internet 80, the mobile phone network 81, and the sending/receiving unit 402 (S142). The controlling unit 405 writes the use condition information to the use condition information table 522 in the secure area of the memory card 50, through the inputting/outputting unit 403 (S143).

The controlling unit 102 generates customer information and registers it (S144). The controlling unit 102 then extracts program information including the received decode program number from the decode program table 111, reads a decode program name and decode program from the extracted program information, and reads the detection program from the information storing unit 103 (S145). The controlling unit 102 sends the decode program number, the decode program name, the decode program, and the detection program to the consumer acquisition device 40, via the sending/receiving unit 101, the Internet 80, and the mobile phone network 81 (S146).

The controlling unit 405 receives the decode program number, the decode program name, the decode program, and the detection program (S146). The controlling unit 405 writes the decode program number, the decode program name, and the decode program to the general area of the memory card 50, and the detection program to the general area of the memory card 50, through the inputting/outputting unit 403 (S147).

(3) Operation of Acquiring a Free Decode Program by the Consumer Acquisition Device 40

Figure 13:
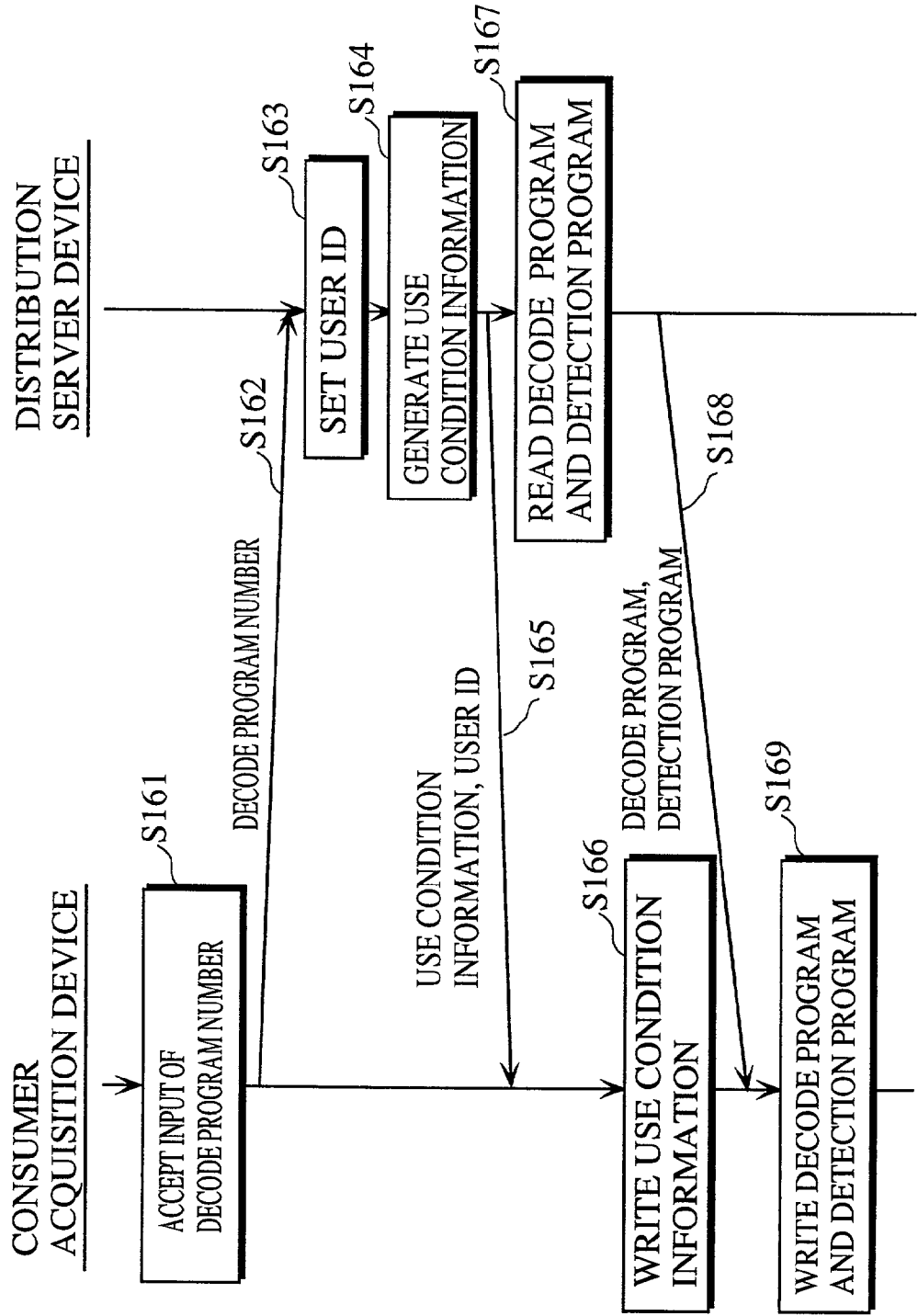
FIG. 13 shows an operation of acquiring a free decode program by the consumer acquisition device.

An operation of acquiring a free decode program by the consumer acquisition device 40 is explained with reference to FIG. 13.

The inputting unit 407 accepts input of a decode program number (S161). The controlling unit 405 sends the decode program number to the distribution server device 10 via the sending/receiving unit 402, the mobile phone network 81, and the Internet 80 (S162).

The controlling unit 102 receives the decode program number from the consumer acquisition device 40, via the mobile phone network 81, the Internet 80, and the sending/receiving unit 101 (S162).

Upon receiving the decode program number, the controlling unit 102 generates a user ID (S163). The controlling unit 102 then extracts program information which includes the received decode program number, from the decode program table 111. The controlling unit 102 generates use condition information based on use condition setting information included in the extracted program information (S164), and sends the user ID and the use condition information to the consumer acquisition device 40 via the sending/receiving unit 101, the Internet 80, and the mobile phone network 81 (S165).

The controlling unit 405 receives the use condition information and the user ID from the distribution server device 10, via the Internet 80, the mobile phone network 81, and the sending/receiving unit 402 (S165). The controlling unit 405 writes the use condition information to the use condition information table 522 in the secure area of the memory card 50, through the inputting/outputting unit 403 (S166).

The controlling unit 102 reads a decode program name and a decode program from the extracted program information, and reads the detection program from the information storing unit 103 (S167). The controlling unit 102 sends the decode program number, the decode program name, the decode program, and the detection program to the consumer acquisition device 40, via the sending/receiving unit 101, the Internet 80, and the mobile phone network 81 (S168).

The controlling unit 405 receives the decode program number, the decode program name, the decode program, and the detection program (S168). The controlling unit 405 writes the decode program number, the decode program name, and the decode program to the general area of the memory card 50, and the detection program to the general area of the memory card 50, through the inputting/outputting unit 403 (S169).

(4) Operation of Acquiring Maintenance Information by the Consumer Acquisition Device 40

Figure 14:
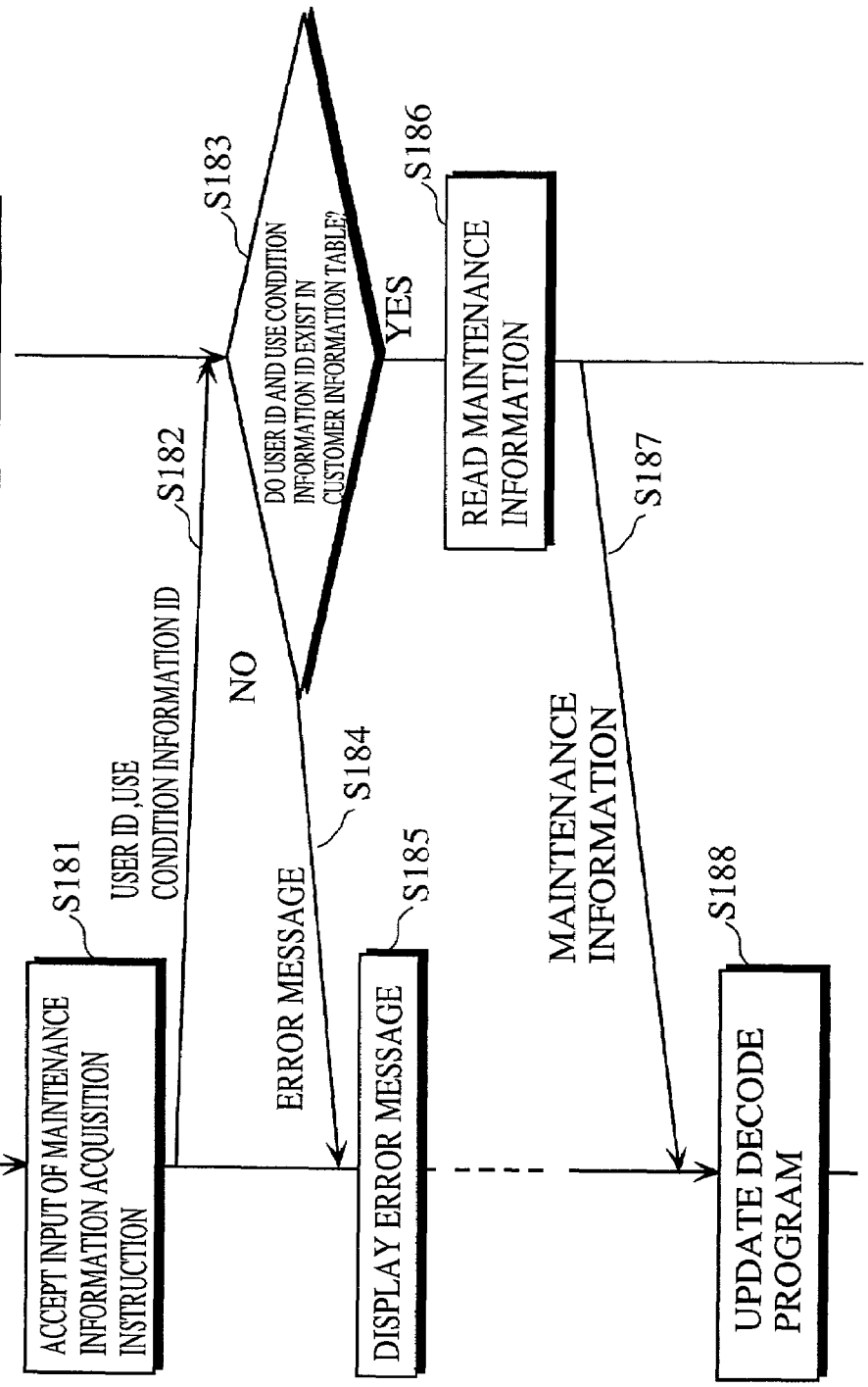
FIG. 14 shows an operation of acquiring maintenance information by the consumer acquisition device.

An operation of acquiring maintenance information by the consumer acquisition device 40 is explained with reference to FIG. 14.

The inputting unit 407 accepts input of an instruction to acquire maintenance information (S181) The controlling unit 405 reads a user ID and a use condition information ID from the secure area of the memory card 50, and sends the user ID and the use condition information ID to the distribution server device 10 via the sending/receiving unit 402, the mobile phone network 81, and the Internet 80 (S182).

The controlling unit 102 receives the user ID and the use condition information ID from the consumer acquisition device 40, via the mobile phone network 81, the Internet 80, and the sending/receiving unit 101 (S182)

The controlling unit 102 judges whether the user ID and the use condition information ID exist in the customer information table 112 (S183). If not, the controlling unit 102 sends an error message indicating such, to the consumer acquisition device 40 via the sending/receiving unit 101, the Internet 80, and the mobile phone network 81 (S184).

The controlling unit 405 receives the error message indicating that the user ID and the use condition information ID are not registered in the distribution server device 10, from the distribution server device 10 via the Internet 80, the mobile phone network 81, and the sending/receiving unit 402 (S184) The controlling unit 405 outputs the error message to the displaying unit 406 (S185).

If the user ID and the use condition information ID are found in the customer information table 112, the controlling unit 102 extracts all decode program numbers corresponding to the user ID and the use condition information ID, from the customer information table 112. The controlling unit 102 extracts program information having the same decode program numbers as the extracted decode program numbers, from the decode program table 111 (S186). If maintenance information presence information in the extracted program information shows "present", the controlling unit 102 sends maintenance information included in the extracted program information, to the consumer acquisition device 40 via the sending/receiving unit 101, the Internet 80, and the mobile phone network 81 (S187).

The controlling unit 405 receives the maintenance information from the distribution server device 10 via the Internet 80, the mobile phone network 81, and the sending/receiving unit 402 (S187), and updates a decode program stored in the memory card 50 using the received maintenance information (S188).

6. Construction of the Audio Player 60

Figure 15:
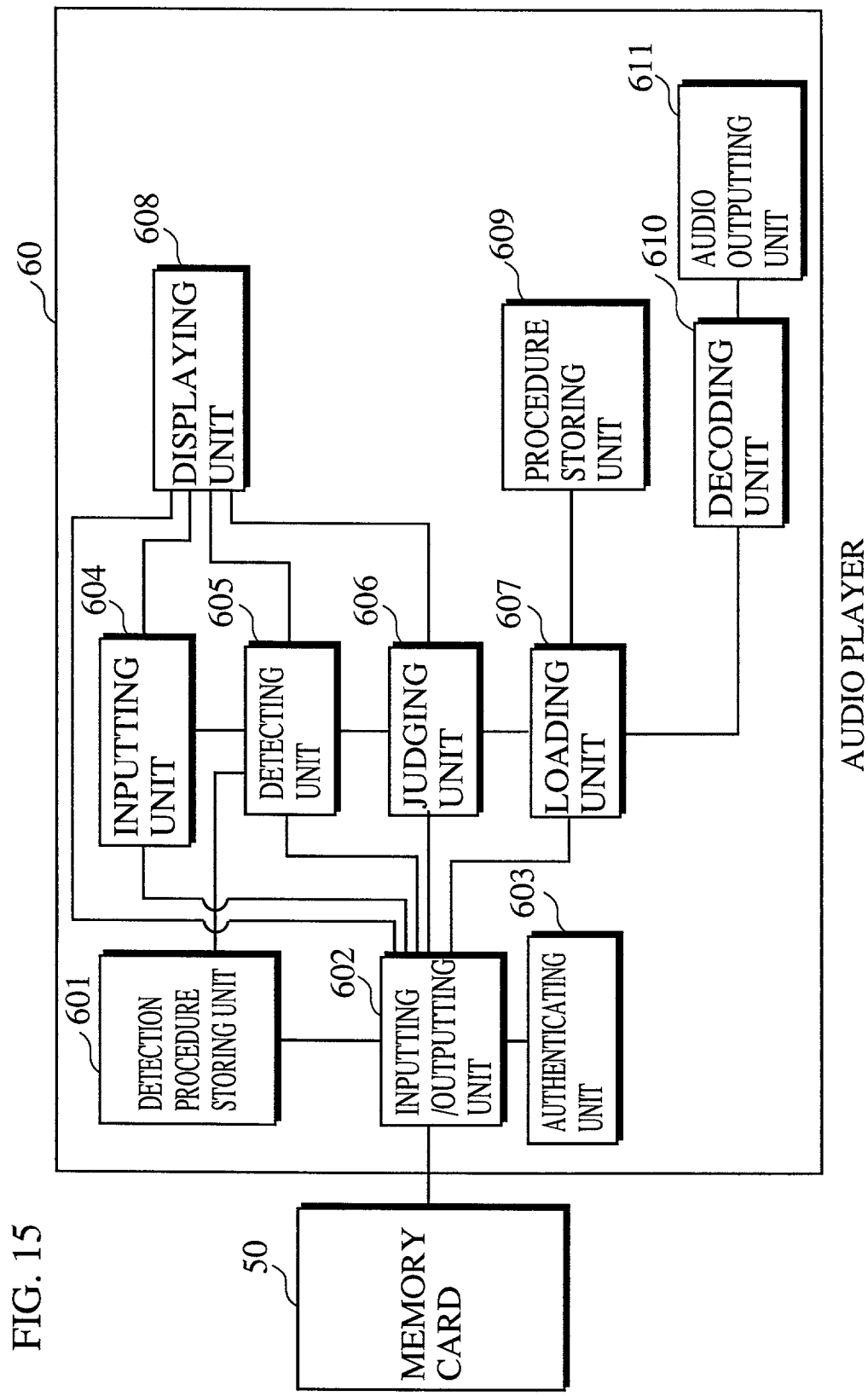
FIG. 15 is a block diagram showing a construction of an audio player shown in FIG. 1.

The audio player 60 includes a detection procedure storing unit 601, an inputting/outputting unit 602, an authenticating unit 603, an inputting unit 604, a detecting unit 605, a judging unit 606, a loading unit 607, a displaying unit 608, a procedure storing unit 609, a decoding unit 610, and an audio outputting unit 611, as shown in FIG. 15. The decoding unit 610 and the procedure storing unit 609 are implemented on a single LSI.

(1) Inputting Unit 604

The inputting unit 604 accepts input of the user's instruction to display information about decode formats, and outputs the instruction to the displaying unit 608.

The inputting unit 604 also accepts input of the user's instruction to play back encoded music data and indication of a music title corresponding to the encoded music data. The inputting unit 604 outputs the playback instruction and the music title to the detecting unit 605.

The inputting unit 604 further accepts input of the user's instruction to read a detection program. Upon receiving this instruction, the inputting unit 604 controls the authenticating unit 603 to perform device authentication with the memory card 50. If the device authentication is successful, the inputting unit 604 instructs the inputting/outputting unit 602 to read the detection program from the memory card 50.

(2) Detection Procedure Storing Unit 601

The detection procedure storing unit 601 has an area for storing the detection program.

(3) Inputting/Outputting Unit 602

The inputting/outputting unit 602 transfers information between the memory unit 501 of the memory card 50 and the authenticating unit 603, the inputting unit 604, the detecting unit 605, the judging unit 606, the loading unit 607, or the displaying unit 608.

The inputting/outputting unit 602 receives a detection program read instruction from the inputting unit 604. Upon receiving the instruction, the inputting/outputting unit 602 reads the detection program 525 from the memory card 50, and writes the detection program to the detection procedure storing unit 601.

(4) Authenticating Unit 603

The authenticating unit 603 receives an instruction to perform device authentication, from construction elements in the audio player 60.

Upon receiving the instruction, the authenticating unit 603 performs device authentication to judge whether the memory card 50 is an authorized device. This device authentication is carried out according to an authentication procedure of the challenge and response format.

If the device authentication has failed, the authenticating unit 603 outputs authentication failure information indicating the failure of the device authentication, to the inputting/outputting unit 602.

If the device authentication has succeeded, then the audio player 60 is subjected to device authentication by the memory card 50. If the device authentication by the memory card 50 has failed, the authenticating unit 603 outputs authentication failure information to the inputting/outputting unit 602. If the device authentication has succeeded, the authenticating unit 603 outputs authentication success information indicating the success of the device authentication, to the inputting/outputting unit 602.

(5) Detecting Unit 605

The detecting unit 605 receives a playback instruction and a music title from the inputting unit 604.

The detecting unit 605 reads a header unit of encoded music data specified by the music title. The detecting unit 605 then reads the detection program stored in the detection procedure storing unit 601, and operates according to the detection program to determine a decode format based on the read header unit. Once the decode format has been determined, the detecting unit 605 outputs a decode program number identifying the decode format. If the decode format cannot be determined, the detecting unit 605 outputs a message indicating such, to the displaying unit 608. It should be noted that a sync pattern is employed in the case of judging codecs of different standards.

The detecting unit 605 outputs the decode program number to the judging unit 606, and transfers control to the judging unit 606.

(6) Judging Unit 606

The judging unit 606 receives the decode program number from the detecting unit 605, and operates in the following manner.

The judging unit 606 searches the use condition information table 522 in the memory card 50 for the received decode program number. When the decode program number cannot be found in the use condition information table 522, the judging unit 606 outputs a message indicating such to the displaying unit 608, and ends the processing.

When the decode program number is found in the use condition information table 522, if time limit information and/or use number information is set corresponding to the decode program number, the judging unit 606 judges whether the current date and time is within a period shown by the time limit information and/or whether a number shown by the use number information is greater than 0. Depending on the judgement result, the judging unit 606 outputs a use prohibition message to the displaying unit 608, or a load instruction to the loading unit 607.

(7) Loading Unit 607

The loading unit 607 receives a load instruction from the judging unit 606.

Upon receiving the load instruction, the loading unit 607 reads subprogram A of a decode program specified by the decode program number, from the decode table 523 in the memory card 50. The loading unit 607 writes subprogram A to the procedure storing unit 609.

The loading unit 607 also receives a load instruction for subprogram A or B, from the decoding unit 610. Upon receiving such a load instruction, the loading unit 607 reads subprogram A or B from the decode table 523 in the memory card 50, and writes it to the procedure storing unit 609.

(8) Displaying Unit 608

The displaying unit 608 receives an instruction to display information about decode formats, from the inputting unit 604.

Upon receiving the instruction, the displaying unit 608 controls the authenticating unit 603 to perform device authentication with the memory card 50. The displaying unit 608 then receives authentication success information or authentication failure information, from the authenticating unit 603 through the inputting/outputting unit 602.

When receiving the authentication success information, the displaying unit 608 reads a decode program number from the use condition information table 522 in the memory card 50. The displaying unit 608 then reads a decode program name corresponding to the read decode program number from the decode table 523 in the memory card 50, and displays the decode program name. The displaying unit 608 repeats this operation for all decode program numbers stored in the use condition information table 522 in the memory card 50.

When receiving the authentication failure information, the displaying unit 608 displays a message indicating the authentication failure.

The displaying unit 608 also receives a message indicating the failure to determine the decode program number, from the detecting unit 605. The displaying unit 608 displays the message.

The displaying unit 608 receives a message indicating that the decode program number does not exist in the use condition information table 522, from the judging unit 606. The displaying unit 608 displays the message.

(9) Procedure Storing Unit 609

The procedure storing unit 609 has an area for storing subprogram A or B.

(10) Decoding Unit 610

The decoding unit 610 has instruction counter IC which indicates a position of an instruction to be executed next in a subprogram.

The decoding unit 610 reads the instruction specified by instruction counter IC, from the procedure storing unit 609.

If the read instruction is an end instruction, the decoding unit 610 sets instruction counter IC at "0".

If the read instruction is a decode instruction, the decoding unit 610 executes decoding according to the decode instruction. When audio data is obtained as a result of the execution of the decode instruction, the decoding unit 610 outputs the audio data to the audio outputting unit 611. When data indicating the end of the music data specified by the music title is detected as a result of the execution of the decode instruction, the decoding unit 610 ends the processing.

If the read instruction is a load instruction to load subprogram A or B, the decoding unit 610 outputs the load instruction to the loading unit 607.

The decoding unit 610 increments instruction counter IC by 1, each time one instruction is executed.

(11) Audio Outputting Unit 611

The audio outputting unit 611 is implemented by a speaker.

The audio outputting unit 611 receives audio data from the decoding unit 610 as an electric signal, converts the audio data to sounds, and outputs them.

7. Operation of the Audio Player 60

An operation of the audio player 60 is explained next.

(1) Operation of Loading and Executing Subprograms

Figure 16:
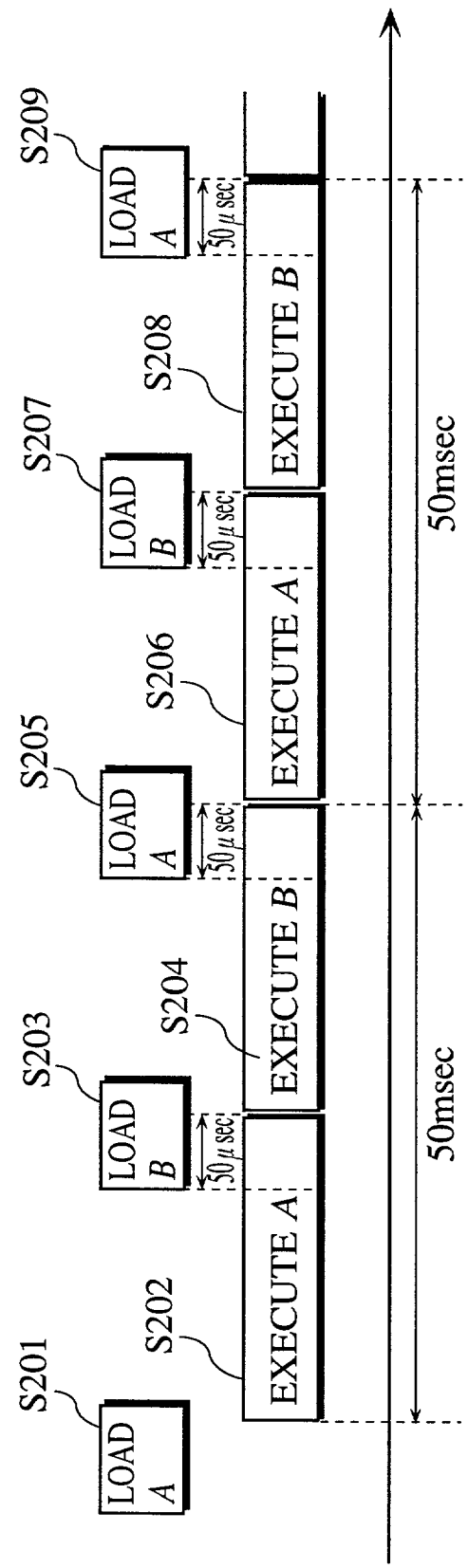
FIG. 16 is a time chart showing an operation of loading and executing subprograms.

An operation of loading and executing subprograms is explained with reference to FIG. 16.

The loading unit 607 loads subprogram A (S201). Once the loading of subprogram A has completed, the decoding unit 610 executes instructions included in subprogram A in sequence (S202).

The decoding unit 610 outputs a load instruction included in subprogram A to the loading unit 607, 50 μsec before the end of subprogram A. The loading unit 607 executes the load instruction (S203). This load instruction is to load subprogram B.

Once the execution of subprogram A has ended, the decoding unit 610 executes subprogram B (S204).

After this, the decoding unit 610 outputs a load instruction included in subprogram B to the loading unit 607, 50 μsec before the end of subprogram B. The loading unit 607 executes the load instruction (S205). This load instruction is to load subprogram A.

Thus, subprograms A and B are executed in turn, as a result of which one block of encoded audio data is decoded. This decoding of an encoded audio block takes no more than 50 msec.

Subsequently, the execution of subprogram A, the loading of subprogram B, the execution of subprogram B, and the loading of subprogram A are repeated in the same way.

(2) Operation of Displaying Information about Decode Formats

Figure 17:
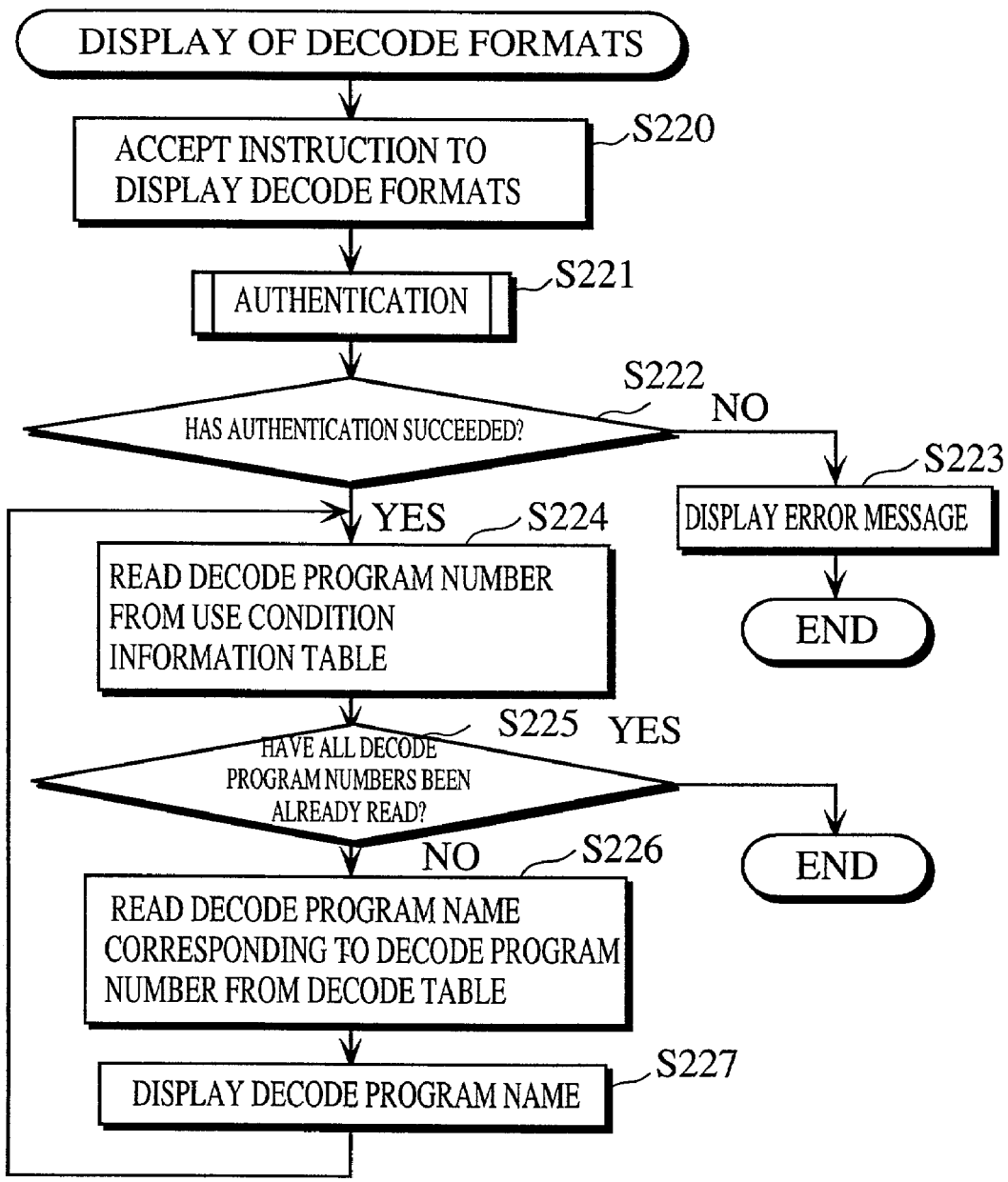
FIG. 17 is a flowchart showing an operation of displaying information about a decode format.

An operation of displaying information about decode formats is explained with reference to FIG. 17.

The inputting unit 604 accepts input of the user's instruction to display information about decode formats, and outputs the instruction to the displaying unit 608 (S220).

The displaying unit 608 controls the authenticating unit 603 to perform device authentication with the memory card 50, and the authenticating unit 603 performs device authentication accordingly (S221).

Upon receiving authentication failure information (S222), the displaying unit 608 displays an authentication failure message (S223), and ends the operation.

Upon receiving authentication success information (S222), the displaying unit 608 reads a decode program number from the use condition information table 522 in the memory card 50 (S224). If all decode program numbers have already been read (S225), the displaying unit 608 ends the operation.

If not, the displaying unit 608 reads a decode program name corresponding to the read decode program number from the decode table 523 in the memory card 50 (S226), and displays the decode program name (S227). The displaying unit 608 then returns to step S224.

(3) Operation of Playing Back Encoded Music Data

Figure 18:
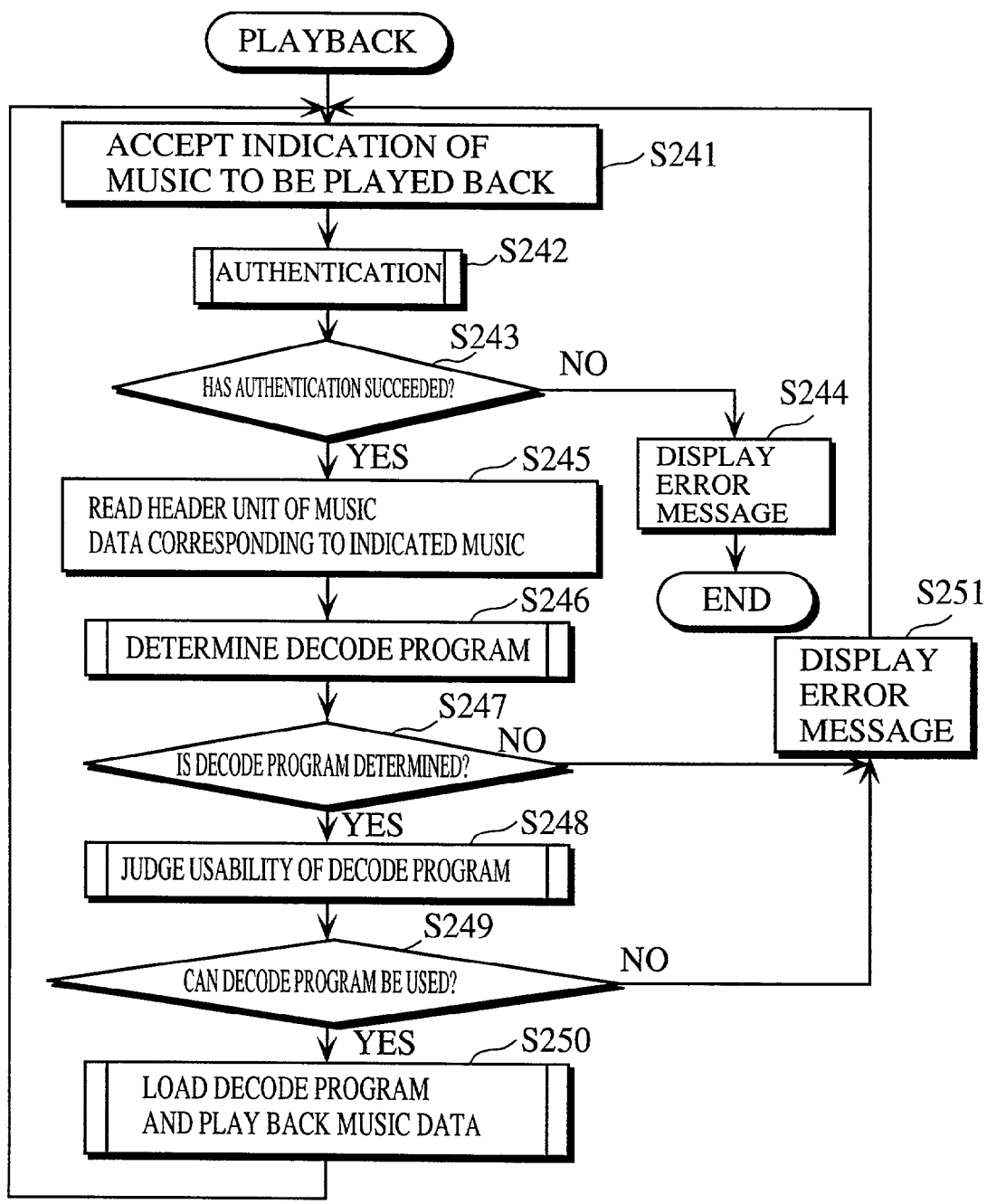
FIG. 18 is a flowchart showing an operation of playing back encoded music data.

An operation of playing back encoded music data is explained with reference to FIG. 18.

The inputting unit 604 accepts input of an instruction to play back encoded music data and an indication of a music title of the encoded music data, from the user (S241). The authenticating unit 603 performs device authentication (S242). If the authentication has failed (S243), the displaying unit 608 displays an authentication failure message (S244), and ends the operation.

If the authentication has succeeded (S243), the inputting unit 604 outputs the playback instruction and the music title to the detecting unit 605. The detecting unit 605 receives the playback instruction and the music title from the inputting unit 604, and reads a header unit of the encoded music data specified by the received music title (S245).

The detecting unit 605 then determines a decode program (S246).

When the decode program cannot be determined (S247), the displaying unit 608 displays a message indicating such (S251), and returns to step S241.

When the decode program is determined (S247), the judging unit 606 judges whether the decode program is permitted to use (S248) If the decode program is not permitted to use (S249), the displaying unit 608 displays a use prohibition message (S251), and returns to step S241.

If the decode program is permitted to use (S249), the loading of the decode program and the playback of the encoded music data are performed (S250). The operation then returns to step S241.

(4) Operation of Device Authentication

Figure 19:
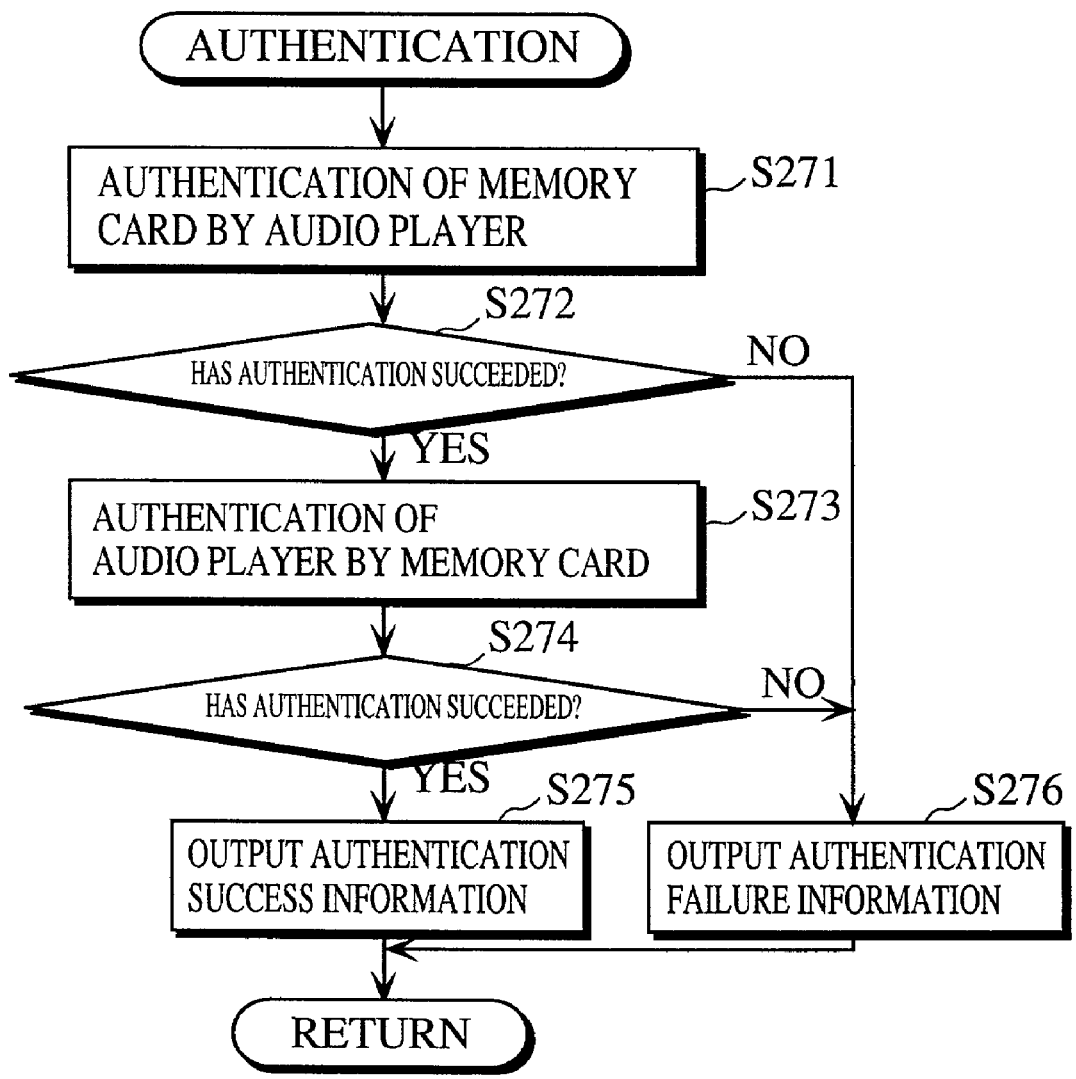
FIG. 19 is a flowchart showing an operation of device authentication.

An operation of device authentication is explained with reference to FIG. 19.

The authenticating unit 603 performs device authentication in the following fashion, on receiving a device authentication instruction from construction elements of the audio player 60.

The authenticating unit 603 performs device authentication as to whether the memory card 50 is an authorized device (S271). When the device authentication has failed (S272), the authenticating unit 603 outputs authentication failure information to the inputting/outputting unit 602 (S276), and ends the operation.

When the device authentication has succeeded (S272), then the audio player 60 is subjected to device authentication by the memory card 50 (S273). If the device authentication by the memory card 50 has failed (S274), the authenticating unit 603 outputs authentication failure information to the inputting/outputting unit 602 (S276), and ends the operation.

If the device authentication by the memory card 50 has succeeded (S274), the authenticating unit 603 outputs authentication success information to the inputting/outputting unit 602 (S275), and ends the operation.

(5) Operation of Determining the Decode program

An operation of determining the decode program by the detecting unit 605 is explained below.

The detecting unit 605 reads the detection program from the detection procedure storing unit 601, and operates according to the detection program to determine the decode program based on the read header unit of encoded music data.

Figure 20:
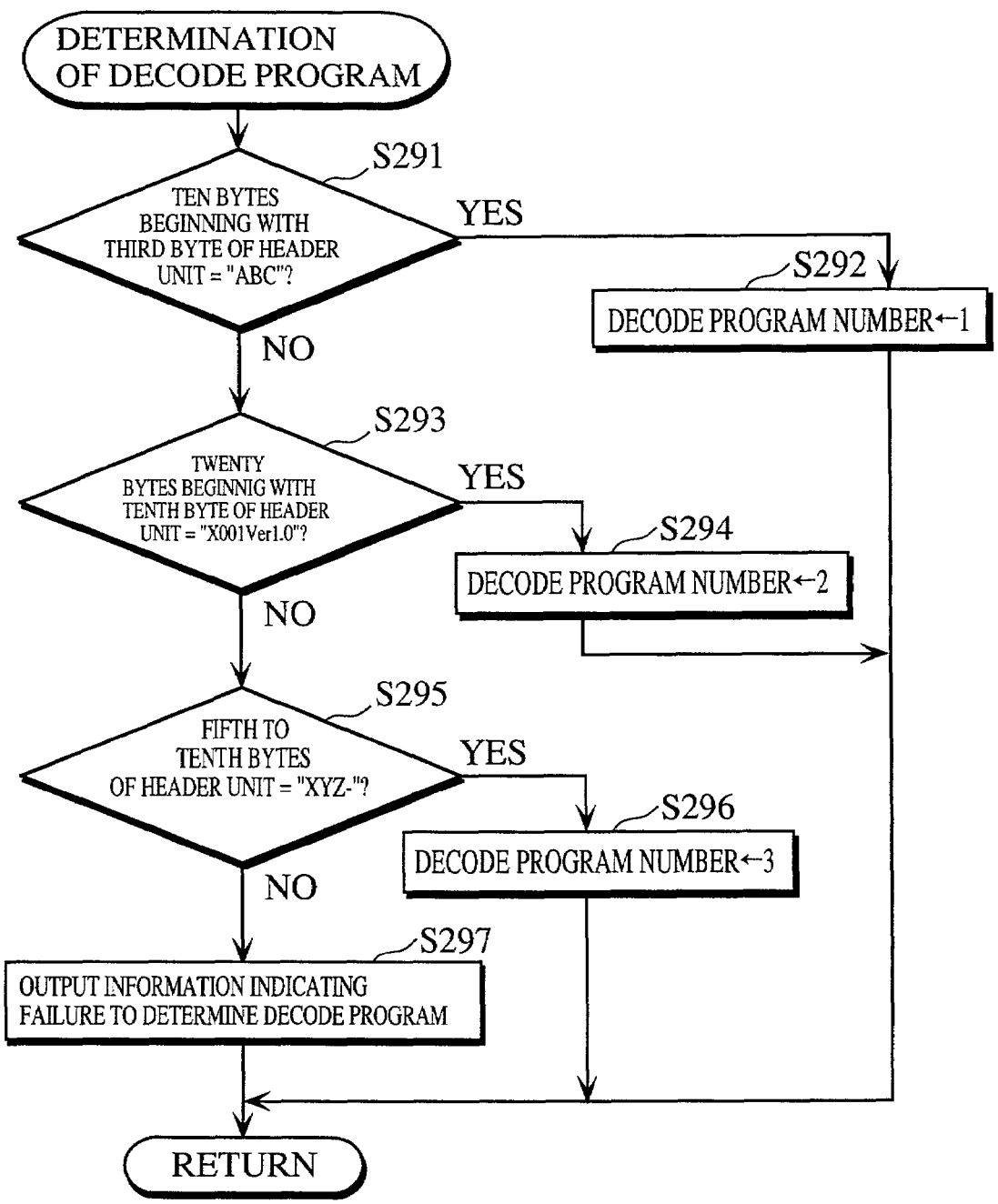
FIG. 20 is a flowchart showing an example of a detection program.

An example detection program is shown in FIG. 20.

The detection program judges whether 10 bytes beginning with the third byte of the header unit are "ABC" (S291). If so, the detection program sets the decode program number at "1" (S292), and ends the operation.

Otherwise, the detection program judges whether 20 bytes beginning with the tenth byte of the header unit are "X001Ver1.0" (S293). If so, the detection program sets the decode program number at "2" (S294), and ends the operation.

Otherwise, the detection program judges whether the fifth to tenth bytes of the header unit are "XYZ-" (S295). If so, the detection program sets the decode program number at "3" (S296), and ends the operation.

If the fifth to tenth bytes are not "XYZ-" in step S295, the detection program outputs information indicating that the decode program cannot be determined (S297), and ends the operation.

(6) Operation of Judging Whether the Decode Program is Permitted to Use

Figure 21:
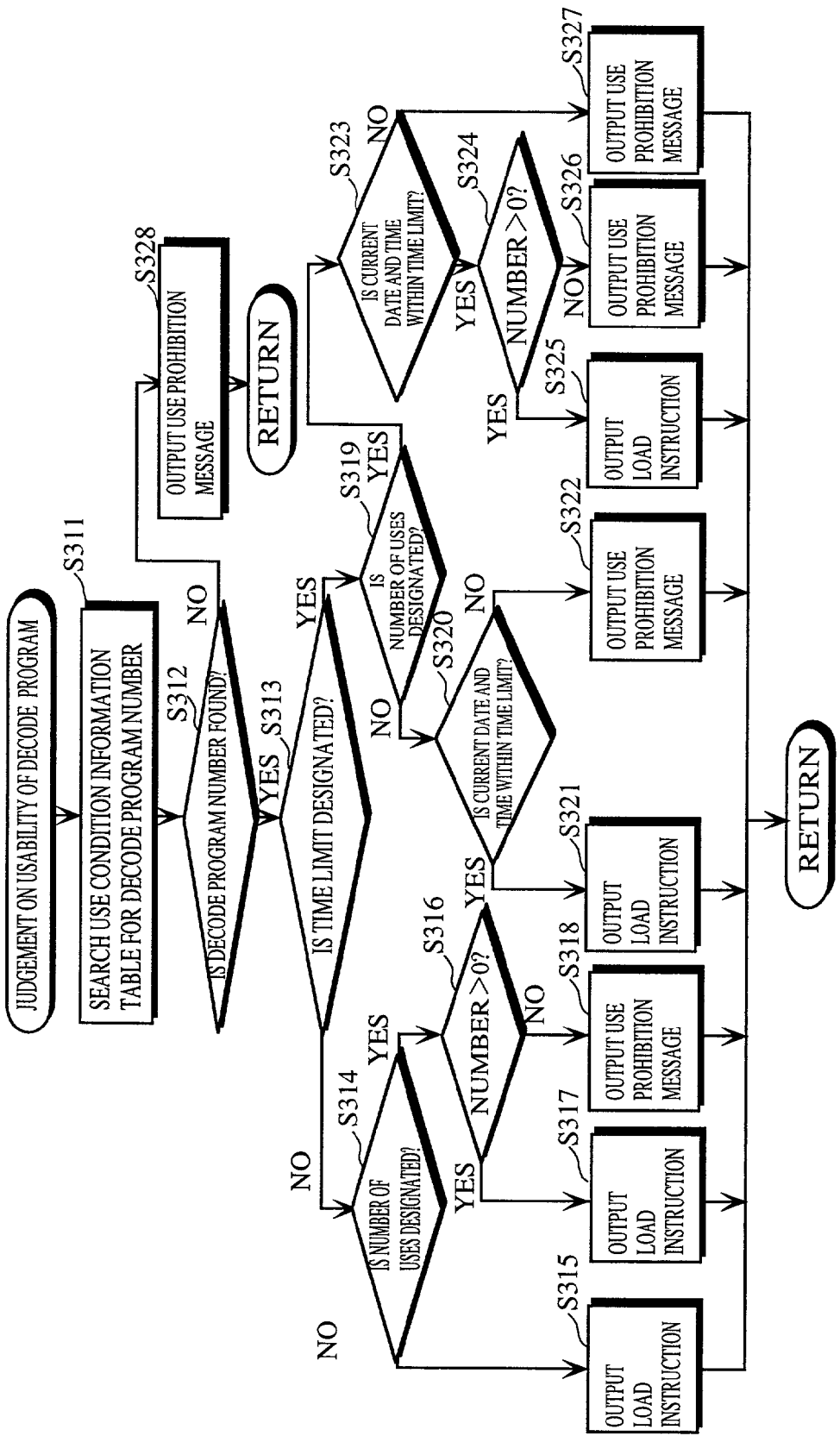
FIG. 21 is a flowchart showing an operation of judging whether a decode program is permitted to use, by a judging unit shown in FIG. 15.

An operation of judging the usability of the decode program by the judging unit 606 is explained with reference to FIG. 21.

The judging unit 606 searches the use condition information table 522 in the memory card 50 for the received decode program number (S311). When the decode program number cannot be found (S312), the judging unit 606 outputs a message indicating such to the displaying unit 608 (S328), and ends the operation.

When the decode program number is present in the use condition information table 522 (S312), if a time limit is designated (S313) and the number of uses is designated (S319) in correspondence with the decode program number, the judging unit 606 judges whether the current date and time is within the time limit (S323) If so, the judging unit 606 judges whether the number of uses is greater than 0 (S324). If the number is greater than 0, the judging unit 606 outputs a load instruction (S325) and ends the operation.

If the number is not greater than 0 in step S324, the judging unit 606 outputs a use prohibition message (S326), and ends the operation.

If the current date and time is not within the time limit in step S323, the judging unit 606 outputs a use prohibition message (S327), and ends the operation.

When the number of uses is not designated in step S319, the judging unit 606 judges whether the current date and time is within the time limit (S320). If so, the judging unit 606 outputs a load instruction (S321) and ends the operation.

If the current date and time is not within the time limit, the judging unit 606 outputs a use prohibition message (S322), and ends the operation.

If the time limit is not designated in step S313 and the number of uses is not designated (S314), the judging unit 606 outputs a load instruction (S315) and ends the operation.

If the number of uses is designated in step S314, the judging unit 606 judges whether the number is greater than 0 (S316). If so, the judging unit 606 outputs a load instruction (S317) and ends the operation.

If the number is not greater than 0 in step S316, the judging unit 606 outputs a use prohibition message (S318), and ends the operation.

(7) Operation of the Loading Unit 607

Figure 22:
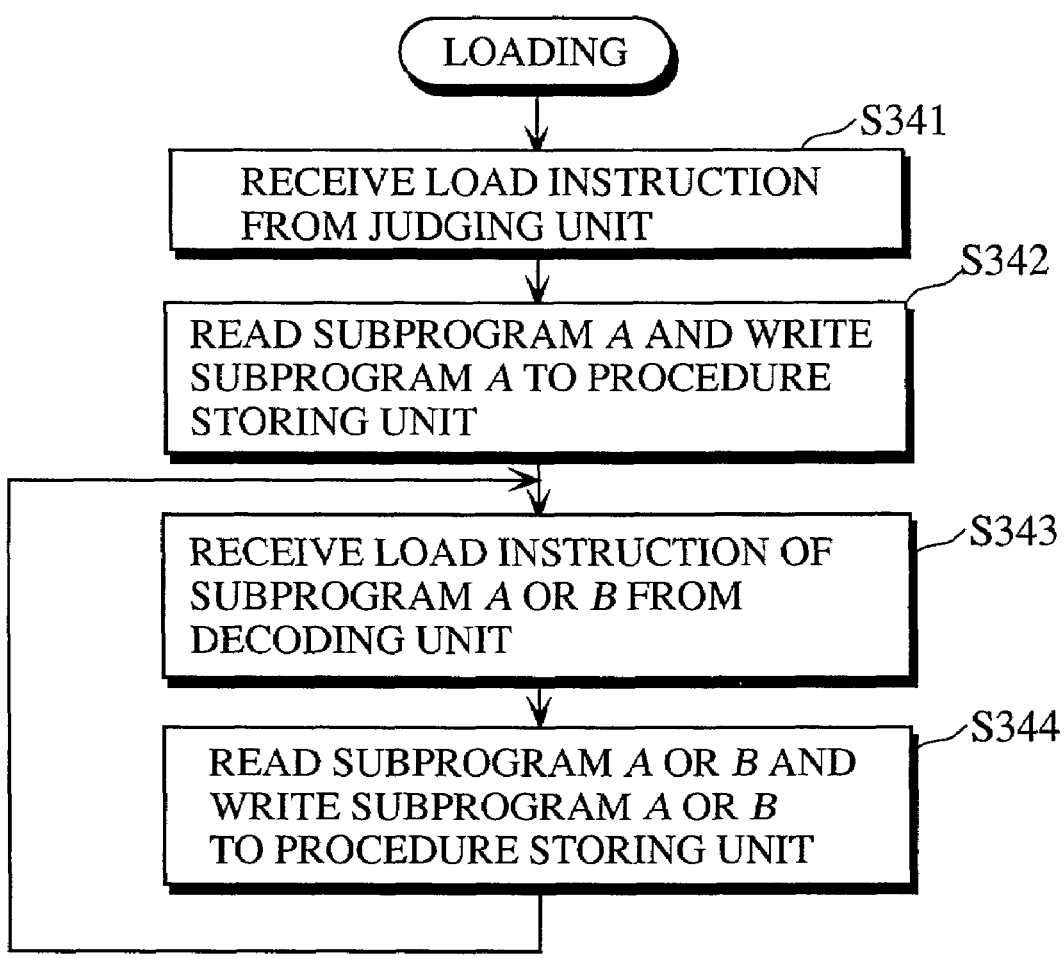
FIG. 22 is a flowchart showing an operation of a loading unit shown in FIG. 15.

An operation of the loading unit 607 is explained with reference to FIG. 22.

The loading unit 607 receives a load instruction from the judging unit 606 (S341), and reads subprogram A of the decode program specified by the determined decode program number, from the decode table 523 in the memory card 50. The loading unit 607 then writes subprogram A to the procedure storing unit 609 (S342)

Next, the loading unit 607 receives a load instruction for subprogram A or B from the decoding unit 610 (343). The loading unit 607 reads subprogram A or B from the decode table 523 in the memory card 50, and writes it to the procedure storing unit 609 (S344).

The loading unit 607 then returns to step S343 and repeats the operation.

(8) Operation of the Decoding Unit 610

Figure 23:
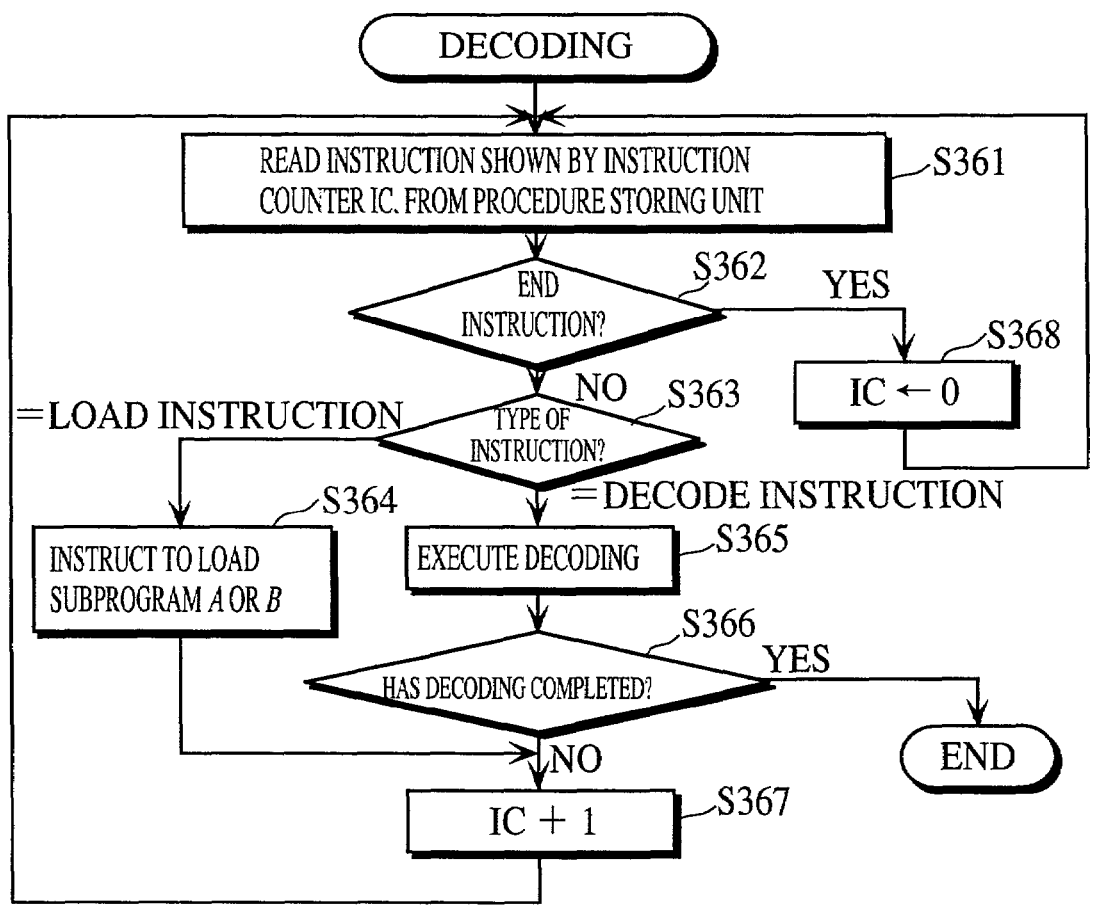
FIG. 23 is a flowchart showing an operation of a decoding unit shown in FIG. 15.

An operation of the decoding unit 610 is explained with reference to FIG. 23.

The decoding unit 610 reads an instruction specified by instruction counter IC, from the procedure storing unit 609 (S361).

If the read instruction is an end instruction (S362), the decoding unit 610 sets instruction counter IC at "0" (S368), and returns to step S361.

If the read instruction is not an end instruction but a decode instruction (S363), the decoding unit 610 executes decoding in accordance with the decode instruction (S365). If data showing the end of the music data is detected as a result of executing the decode instruction (S366), the decoding unit 610 ends the operation.

If the read instruction is a load instruction (S363), the decoding unit 610 outputs the load instruction to load subprogram A or B, to the loading unit 607 (S364).

The decoding unit 610 increments instruction counter IC by 1, each time an instruction is executed (S367). The decoding unit 610 then returns to step S361.

Thus, the decoding unit 610 sets instruction counter IC at "0" upon detecting an end instruction in a subprogram. Hence an instruction at the top of the other subprogram will be read next.

8. Modification (1)

A modification of the distribution system 1 is shown below.

Each decode program is made up of a unique procedure program and a common procedure program. The unique procedure program is a subprogram which is unique to each individual decode program. For instance, a procedure of decoding compression-encoded data differs for each decode program. The common procedure program is a subprogram which is common to all decode programs. For instance, data input/output processing and input/output processing using external registers are common to the decode programs.

The distribution server device 10 stores a unique procedure program for each decode program.

The distribution server device 10 distributes the unique procedure program to the trader acquisition device 30 or the consumer acquisition device 40, and the memory card 50 stores the unique procedure program.

Figure 24:
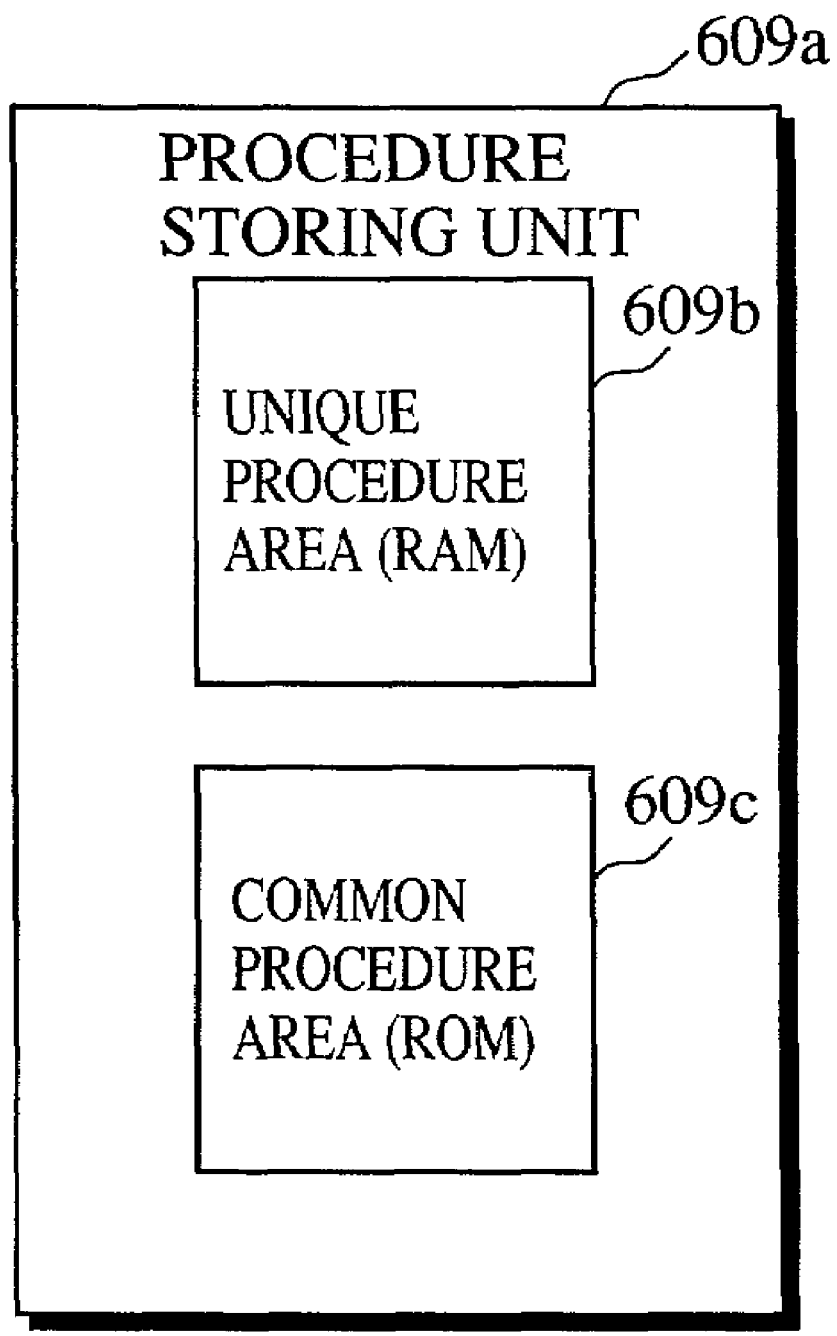
FIG. 24 is a block diagram showing a construction of a procedure storing unit, as a modification of the invention.

The audio player 60 is equipped with a procedure storing unit 609a shown in FIG. 24, in place of the procedure storing unit 609.

The procedure storing unit 609a is made up of a unique procedure area 609b and a common procedure area 609c, as shown in the drawing.

The unique procedure area 609b is made of a semiconductor memory which can be read and written, and has an area for storing the unique procedure program.

The common procedure area 609c is made of a read-only semiconductor memory, and stores the common procedure program in advance.

The loading unit 607 reads the unique procedure program from the memory card 50, and writes it to the unique procedure area 609b.

The decoding unit 610 decodes encoded music data, using the unique procedure program and common procedure program stored respectively in the unique procedure area 609*b* and common procedure area 609*c*.

9. Modification (2)

Another modification of the distribution system 1 is shown below.

(Decode Program)

Figure 25:
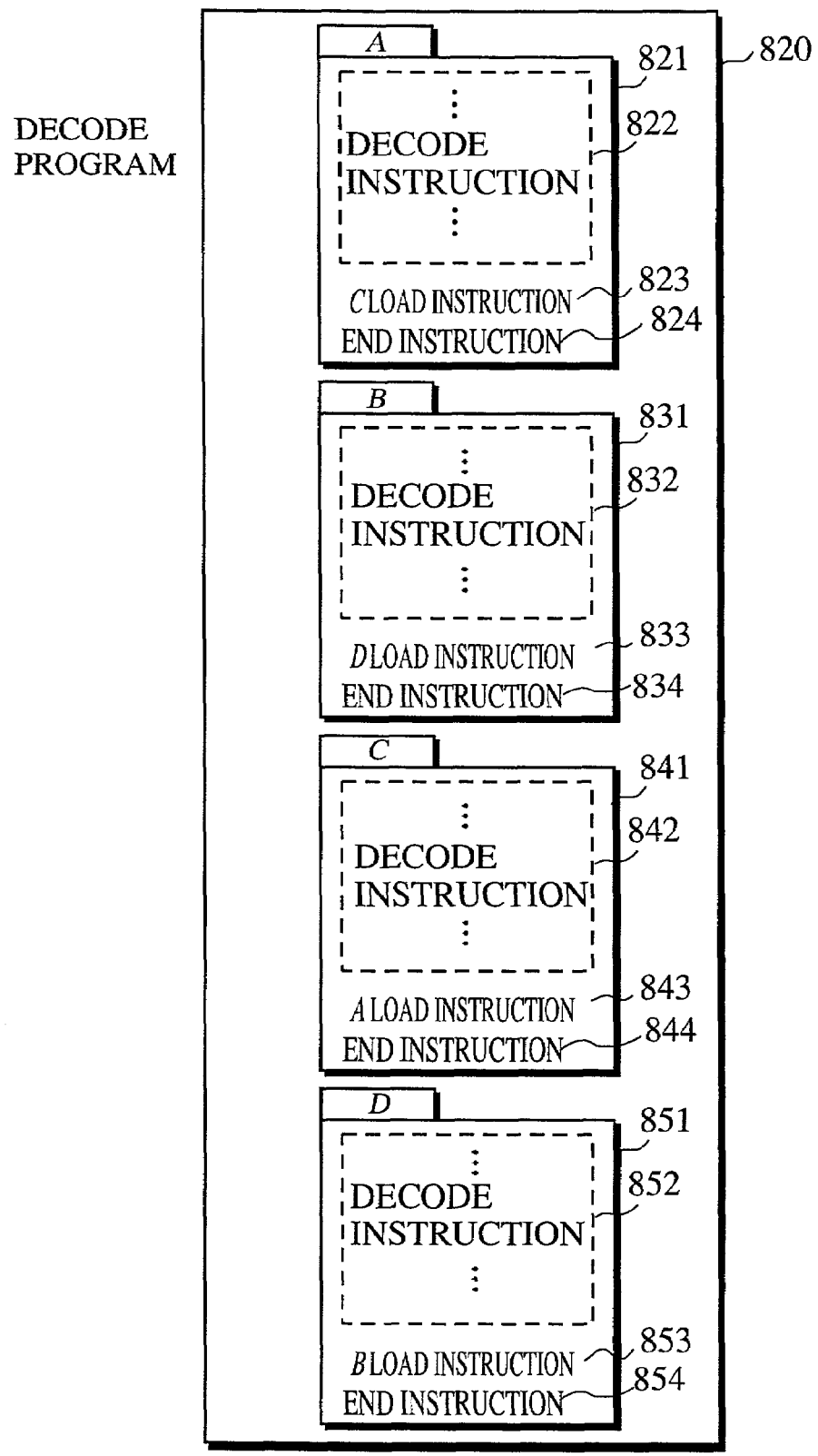
FIG. 25 shows a decode program as a modification of the invention.

A decode program is shown in FIG. 25. A decode program 820 is composed of subprogram A 821, subprogram B 831, subprogram C 841, and subprogram D 851.

An encoded audio block is decoded by executing subprogram A 821, subprogram B 831, subprogram C 841, and subprogram D 851 in this order.

Subprogram A 821 is made up of a plurality of decode instructions 822, a C load instruction 823, and an end instruction 824. The C load instruction 823 is an instruction to read subprogram C 841. The end instruction 824 is an instruction to end subprogram A 821. The instructions which make up subprogram A 821 are executed in the order of description in the subprogram.

Subprogram B 831 is made up of a plurality of decode instructions 832, a D load instruction 833, and an end instruction 834, like subprogram A 821. The meaning of each instruction is as explained above.

Subprogram C 841 and subprogram D 851 have the same structure as above.

(Distribution Server Device 10, Trader Acquisition Device 30, and Consumer Acquisition Device 40)

The distribution server device 10 stores the above decode program, and sends it to the trader acquisition device 30 or the consumer acquisition device 40.

The trader acquisition device 30 or the consumer acquisition device 40 receives the decode program, and writes it to the memory card 50.

(Audio Player 60)

Figure 26:
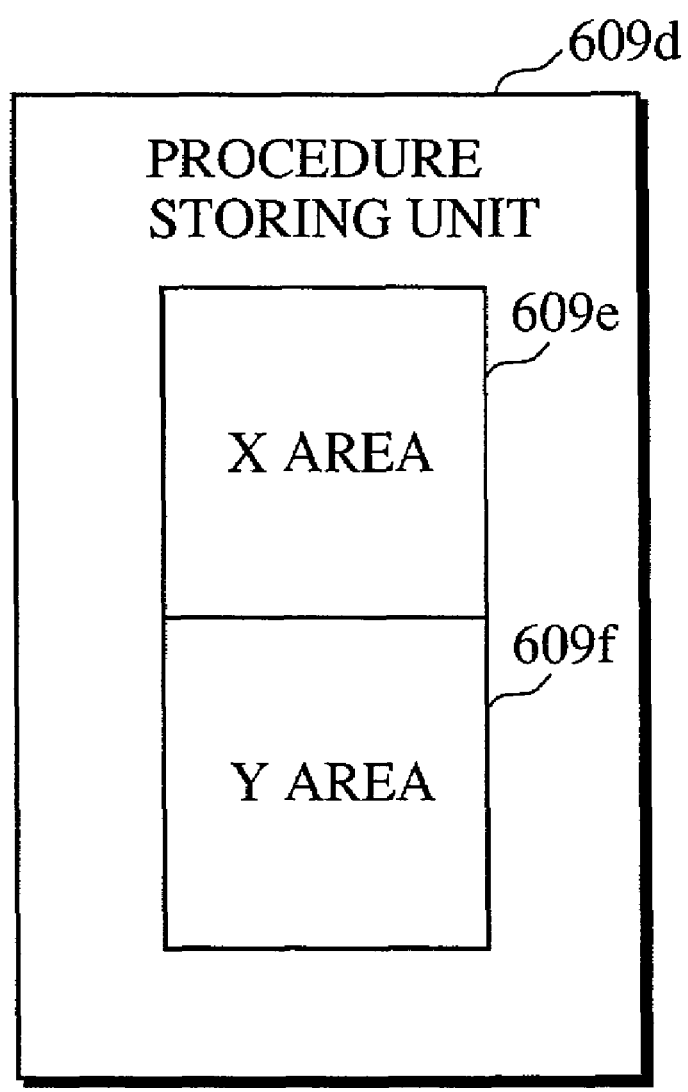
FIG. 26 is a block diagram showing a construction of a procedure storing unit, as a modification of the invention.

The audio player 60 is equipped with a procedure storing unit 609*d* shown in FIG. 26, in place of the procedure storing unit 609.

The procedure storing unit 609*d* is composed of an X area 609*e* and a Y area 609*f*. The X area 609*e* and the Y area 609*f* are each made of a semiconductor memory which can be read and written, and are each used for storing a subprogram.

Figure 27:
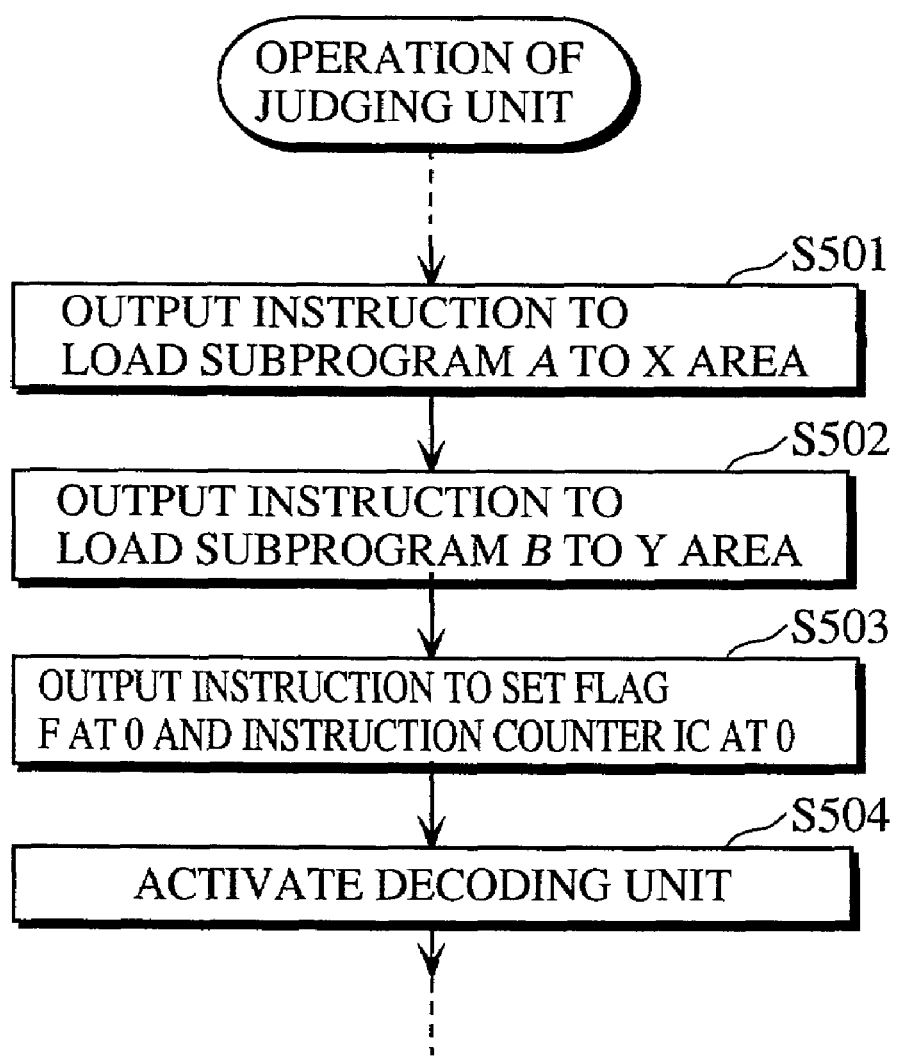
FIG. 27 is a flowchart showing an operation of the judging unit, as a modification of the invention.

The judging unit 606 operates as shown in FIG. 27, upon judging that the decode program is permitted to use.

The judging unit 606 outputs an instruction to load subprogram A into the X area 609*e*, to the loading unit 607. The loading unit 607 accordingly reads subprogram A from the memory card 50, and writes it to the X area 609*e* (S501). The judging unit 606 outputs an instruction to load subprogram B into the Y area 609*f*, to the loading unit 607. The loading unit 607 accordingly reads subprogram B from the memory card 50, and writes it to the Y area 609*f* (S502). The judging unit 606 then outputs an instruction to set flag F at "0" and an instruction to set instruction counter IC at "0", to the decoding unit 610 (S503), and activates the decoding unit 610 (S504).

Figure 28:
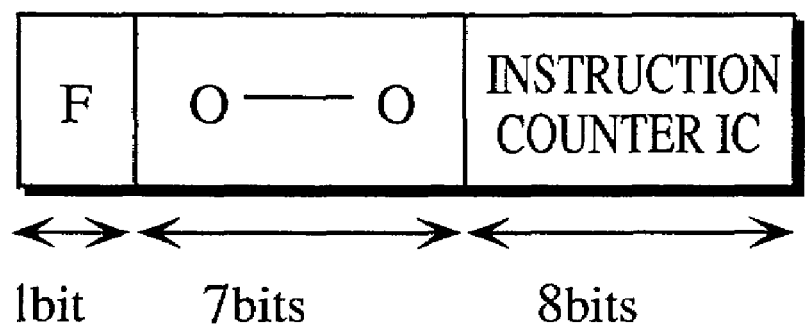
FIG. 28 shows a structure of extension instruction counter EIC equipped in the decoding unit, as a modification of the invention.

The decoding unit 610 is equipped with extension instruction counter EIC shown in FIG. 28. Extension instruction counter EIC shows a position of an instruction to be executed next, in the procedure storing unit 609*d*. Extension instruction counter EIC is made up of 1-bit flag F, a 7-bit fixed unit, and 8-bit instruction counter IC. Flag F takes the value of "0" or "1". When flag F is "0", the X area 609*e* is indicated. When flag F is "1", the Y area 609*f* is indicated. The fixed unit stores a 7-bit value "0000000" (in binary) Instruction counter IC shows a position of an instruction in the X or Y area.

Figure 29:
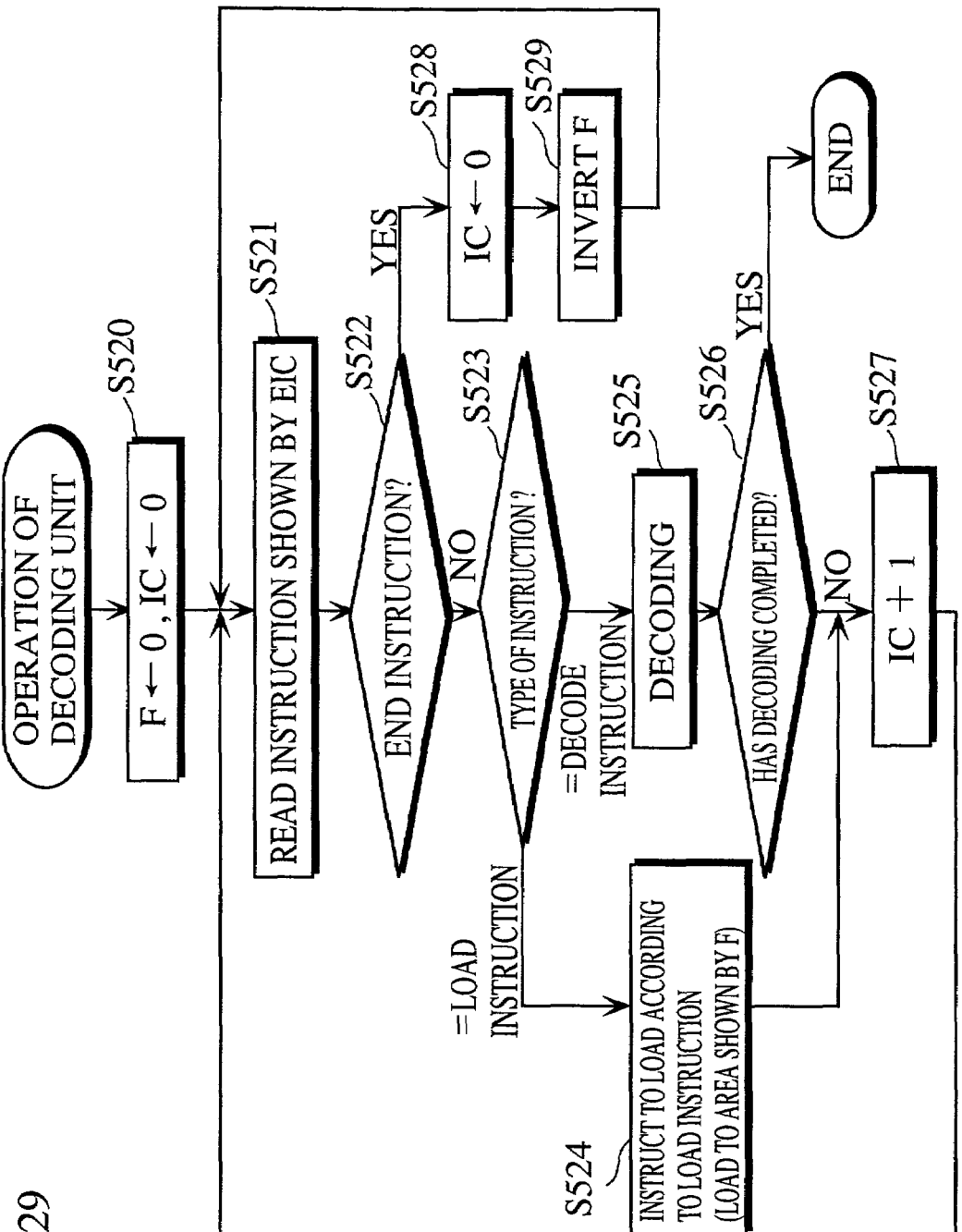
FIG. 29 is a flowchart showing an operation of the decoding unit, as a modification of the invention.

An operation of the decoding unit 610 is explained by referring to FIG. 29.

The decoding unit 610 sets flag F at "0", and instruction counter IC at "0" (S520).

The decoding unit 610 reads an instruction shown by extension instruction counter EIC, from the procedure storing unit 609*d* (S521).

When the read instruction is an end instruction (S522), the decoding unit 610 sets instruction counter IC at "0" (S528), inverts the bit of flag F (S529), and returns to step S521.

When the read instruction is not an end instruction but a decode instruction (S523), the decoding unit 610 performs decoding in accordance with the decode instruction (S525). If data indicating the end of the music data is detected as a result of executing the decode instruction (S526), the decoding unit 610 ends the operation.

When the read instruction is a load instruction (S523), the decoding unit 610 outputs a load instruction to load a subprogram to an area shown by flag F, to the loading unit 607 (S524).

The decoding unit 610 increments instruction counter IC by 1, each time an instruction is executed (S527). The decoding unit 610 then returns to step S521.

Thus, the decoding unit 610 inverts flag F upon detecting an end instruction in a subprogram, so that an area from which an instruction is read next is switched. For instance, when an end instruction is detected in a subprogram stored in the X area 609*e*, flag F is inverted to show the Y area 609*f*, so that the decoding unit 610 reads an instruction from the Y area 609*f* next. In this way, the X and Y areas are switched every time an end instruction is detected.

Figure 30:
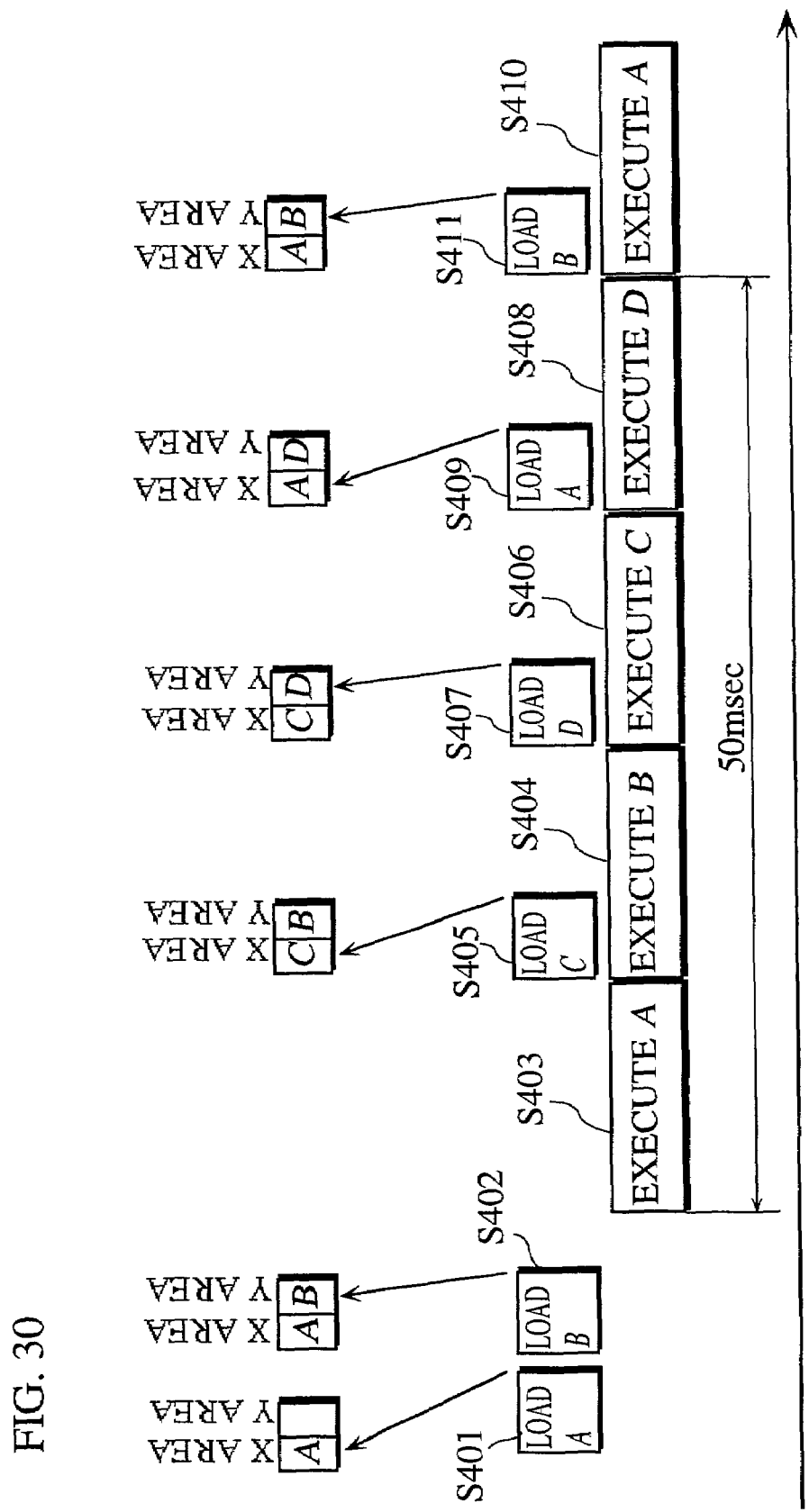
FIG. 30 is a time chart showing an operation of loading and executing subprograms, as a modification of the invention.

An operation of loading and executing subprograms by the loading unit 607 and decoding unit 610 is explained by referring to FIG. 30.

The loading unit 607 loads subprogram A to the X area 609*e* (S401), and loads subprogram B to the Y area 609*f* (S402). Once the loading of subprograms A and B has completed, the decoding unit 610 sequentially executes the instructions in subprogram A (S403).

When the execution of subprogram A by the decoding unit 610 has ended, the loading unit 607 loads subprogram C to the X area 609*e* (S405). At the same time, the decoding unit 610 sequentially executes the instructions in subprogram B (S404).

After the execution of subprogram B by the decoding unit 610 has completed, the loading unit 607 loads subprogram D to the Y area 609*f* (S407) At the same time, the decoding unit 610 sequentially executes the instructions in subprogram C (S406).

After the execution of subprogram C by the decoding unit 610 has completed, the loading unit 607 loads subprogram A to the X area 609*e* (S409). At the same time, the decoding unit 610 sequentially executes the instructions in subprogram D (S408).

Thus, one block of encoded audio data is decoded. This decoding of an encoded audio block takes no more than 50 msec.

10. Modification (3)

Figure 31:
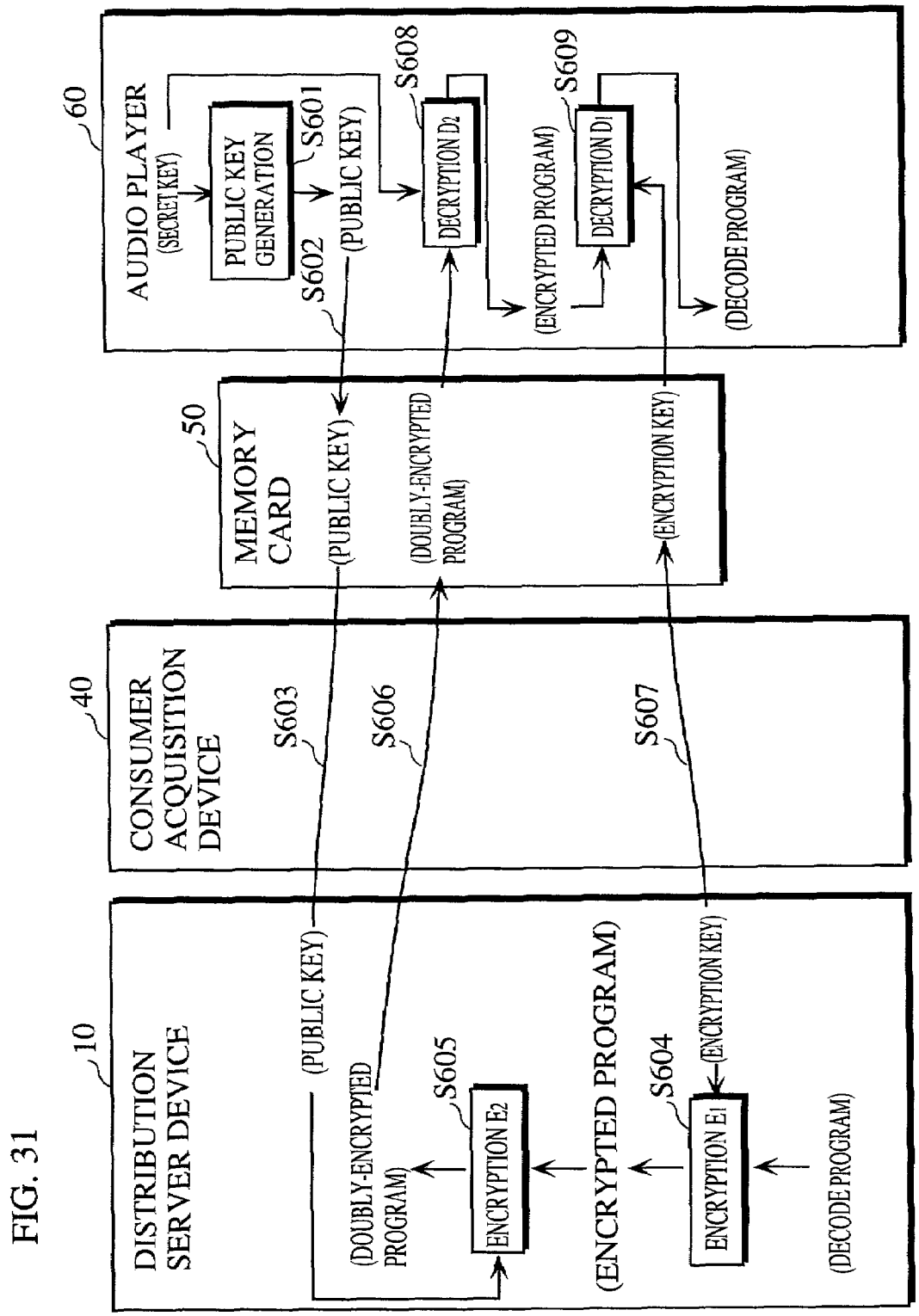
FIG. 31 shows a modification to the distribution system.

Another modification of the distribution system 1 is given with reference to FIG. 31.

The audio player 60 stores a secret key in advance. The audio player 60 generates a public key from the secret key using a public key generation algorithm (S601). The public key generation algorithm is a known technique, so that its explanation is omitted here. The audio player 60 writes the generated public key to the memory card 50 (S602).

The distribution server device 10 acquires the public key written in the memory card 50 through the consumer acquisition device 40, and holds it.

The distribution server device 10 stores an encryption key in advance.

The distribution server device 10 encrypts a decode program stored beforehand, using the encryption key according to encryption algorithm E1. As a result, an encrypted program is generated (S604). The distribution server device 10 then encrypts the encrypted program using the public key according to encryption algorithm E2, to generate a doubly-encrypted program (S605). The distribution server device 10 writes the doubly-encrypted program to the memory card 50 via the consumer acquisition device 40 (S606), and writes the encryption key to the memory card 50 via the consumer acquisition device 40 (S607).

The audio player 60 decrypts the doubly-encrypted program stored in the memory card 50, using the secret key according to decryption algorithm D2. As a result, the encrypted program is obtained (S608). The audio player 60 then decrypts the encrypted program using the encryption key stored in the memory card 50, according to decryption algorithm D1. As a result, the decode program is obtained (S609).

The audio player 60 decodes encoded music data using the obtained decode program.

Here, decryption algorithm D1 is an algorithm to decrypt ciphertext generated by encryption algorithm E1. Meanwhile, decryption algorithm D2 is an algorithm to decrypt ciphertext generated by encryption algorithm E2. These encryption and decryption algorithms are known techniques, so that their explanation is omitted here.

11. Modification (4)

The above embodiment and modifications describe the case where a decode program is made up of more than one subprogram and the audio player 60 executes these subprograms alternately. However, the decode program may be a single inseparable program, so that the audio player 60 reads the single program and executes it.

12. Summary of the Audio Player 60

As described above, the audio player 60 is an audio reproduction device. To recover an original signal from a compression-encoded signal while supporting multiple compression-encode formats, the audio reproduction device is provided with: a decode procedure storing unit for storing a plurality of decode procedures; a procedure storing unit for temporarily storing a specific decode procedure out of the plurality of decode procedures; a detecting/loading unit for detecting a compression-encode format of the input compression-encoded signal, selecting a decode procedure corresponding to the detected compression-encode format from the decode procedure storing unit, and loading it to the procedure storing unit; and a decoding unit for decoding the input compression-encoded signal to the original signal according to the loaded decode procedure. The procedure storing unit and the decoding unit are implemented on the same semiconductor chip.

Also, to recover an original signal from a compression-encoded signal while supporting multiple compression-encode formats, the audio reproduction device is provided with: a decode procedure storing unit for storing a plurality of decode procedures; a first procedure storing unit for temporarily storing a decode procedure, among the plurality of decode procedures, which is unique to a specific compression-encode format; a second procedure storing unit for permanently storing a decode procedure which is common to all compression-encode formats; a detecting/loading unit for detecting a compression-encode format of the input compression-encoded signal, selecting a decode procedure corresponding to the detected compression-encode format from the decode procedure storing unit, and loading it to the first procedure storing unit; and a decoding unit for decoding the input compression-encoded signal to the original signal using the decode procedures stored in the first and second procedure storing units. The first and second procedure storing units and the decoding unit are implemented on the same semiconductor chip.

Also, to recover an original signal from a compression-encoded signal corresponding to a predetermined compression-encode format, the audio reproduction device is provided with: a decode procedure storing unit for storing a decode procedure which is divided according to a predetermined rule; a procedure storing unit for temporarily storing any of the divided decode procedure portions; a loading unit for reading the divided decode procedure portion from the decode procedure storing unit and loading it to the procedure storing unit; and a decoding unit for decoding the input compression-encoded signal to the original signal according to the divided decode procedure portion in the procedure storing unit. The procedure storing unit and the decoding unit are implemented on the same semiconductor chip.

Also, to recover an original signal from a compression-encoded signal corresponding to a predetermined compression-encode format, the audio reproduction device is provided with: a decode procedure storing unit for storing a decode procedure which is divided by a predetermined rule; a plurality of procedure storing units for temporarily storing the divided decode procedure portions alternately; a loading unit for reading a divided decode procedure portion which is required for the next decoding when continuously executing the divided decode procedure portions, and loading it to a procedure storing unit which does not store a divided decode procedure portion that is currently executed; and a decoding unit for decoding the input compression-encoded signal to the original signal using the divided decode procedure portions in the procedure storing units. The procedure storing units and the decoding unit are implemented on the same semiconductor chip.

Here, each procedure storing unit has a function of notifying the loading unit that the next divided decode procedure portion is needed, when the current divided decode procedure portion is running. In this way, the loading unit loads the next divided decode procedure portion to a procedure storing unit which is not currently used, in advance.

Also, the procedure storing unit has a function of detecting the execution order of each divided decode procedure portion and notifying the loading unit that the next divided decode procedure portion is needed. In this way, the loading unit loads the next divided decode procedure portion to a procedure storing unit which is not currently used, beforehand.

The notification by the procedure storing unit is made by detecting signal input/output in each divided decode procedure portion.

Thus, when there are many different compression-encode formats, only a decode procedure corresponding to a compression-encode format used for generating an input compression-encoded signal is loaded in the procedure storing unit, with it being possible to reduce the size of the procedure storing unit. Accordingly, the LSI decoder can be realized with a small-scale circuit, which contributes to reductions in LSI cost.

In addition, the decode procedure storing unit that stores the plurality of decode procedures is realized by an inexpensive device equipped outside the decoder, which enables a signal processing device to be realized with an overall low cost.

13. Other Modifications

Though the present invention has been described based on the above embodiment, the invention should not be limited to such. For instance, the following modifications are applicable.

(1) The end of a divided decode procedure portion which is being executed may be determined by detecting the size of the divided decode procedure portion beforehand and judging how far the divided decode procedure portion has been executed. Also, since the end of the divided decode procedure portion is accompanied by input/output of data, the end may be determined by detecting the input/output timing of the data.

(2) The memory card 50 is described as storing a plurality of decode programs separately. Here, each program in the memory card 50 may be further divided according to function.

(3) The above embodiment describes an example where a memory card is used, but the invention is not limited to the use of this recording medium. The same effects may still be achieved if any removable memory unit, such as a removable circuit board equipped with a memory chip, is used.

(4) The above embodiment describes the case where maintenance information is a program for amending a decode program, and the audio player 60 receives the maintenance information from the distribution server device 10, and updates the decode program stored in the memory card 50 using the received maintenance information. However, this can be modified as follows.

Maintenance information is a new decode program, so that the audio player 60 receives the maintenance information from the distribution server device 10, and replaces the decode program stored in the memory card 50 with the received maintenance information.

(5) The above embodiment can be modified such that the audio player 60 stores the detection program beforehand. This being so, the audio player 60 detects a type of encoded audio data which the user wants to play back using the detection program, to specify a decode program necessary for the encoded audio data.

Here, the detection program may be stored in a non-rewritable ROM storage area.

Also, the audio player 60 may receive a new detection program from the distribution server device 10, and uses the received detection program instead of the detection program stored beforehand.

(6) The above embodiment describes the case where the audio player 60 acquires a decode program, a detection program, and other information from the trader acquisition device 30 or the consumer acquisition device 40 via the memory card 50, but the audio player 60 may have a storage area similar to the memory card 50, and be connected to the trader acquisition device 30 or the consumer acquisition device 40, which writes the decode program, the detection program, and the other information into the storage area in the audio player 60.

(7) The present invention also applies to the methods used by the devices described above. These methods may be realized by computer programs that are executed by computers. Such computer programs may be distributed.

The present invention may be realized by a computer-readable recording medium, such as a flexible disk, a hard disk, a CD-ROM, an MO, a DVD, a DVD-ROM, a DVD-RAM, or a semiconductor memory, on which computer programs mentioned above are recorded. Conversely, the invention may also be realized by a computer program that is recorded on a recording medium.

Computer programs that achieve the invention may also be transmitted via a network, such as an electronic communication network, a wired or wireless communication network, or the Internet.

The present invention can also be realized by a computer system that includes a microprocessor and a memory. In this case, a computer program can be stored in the memory, with the microprocessor operating in accordance with this computer program.

The computer programs may be provided to an independent computer system by distributing a recording medium on which the computer programs are recorded, or by transmitting the computer program via a network. The independent computer system may then execute the computer program to function as the present invention.

(8) The limitations described in the embodiment and the modifications may be freely combined.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A distribution system that distributes a program for decoding encoded audio data, comprising:

a distribution server device which sends the program and permission information which indicates that the program is permitted for use, in correspondence with the program;

a removable memory unit which has an area for storing one or more programs which are each used for decoding encoded audio data of a different type;

an acquisition device which, being connected to said distribution server device via a network and loaded with said removable memory unit, acquires the permission information and the program from said distribution server device and stores the permission information and the program in said removable memory unit, the permission information being stored in correspondence with the program; and an audio reproduction device which, being loaded with said removable memory unit storing the program, decodes the encoded audio data using the program, and outputs sounds, and said audio reproduction device stores a detection module beforehand, said detection module being a program module used for detecting a type of the encoded audio data, wherein the distribution system further generates a user identifier which identifies a user of said audio reproduction device, stores the generated user identifier, sends the generated user identifier, and also distributes maintenance information for updating the program, said acquisition device acquires the user identifier and stored the user identifier in said removable memory unit, reads the identifier from said removable memory unit, and sends the user identifier to said distribution server device, said distribution server device (a) stores the maintenance information beforehand in correspondence with the program, (b) receives the identifier,(c) judges whether the received user identifier matches the user identifier stored in said distribution server device, and (d) sends the maintenance information if the two user identifiers are judged as matching, and said acquisition device acquires the maintenance information, and updates the program stored in said removable memory unit using the acquired maintenance information, and said audio reproduction device detects the type of the encoded audio data using the detection module, reads the program for decoding encoded audio data of the detected type from said removable memory unit, and decodes the encoded audio data using the read program, and said audio reproduction device decodes the encoded audio data using the program, only when the permission information corresponding to the program is stored in said removable memory unit.

2. The distribution system of claim 1, wherein said distribution server device generates a permission information identifier which identifies the permission information, stores the generated permission information identifier, and also sends the generated permission information identifier, and said acquisition device acquires the permission information identifier, and stores the permission information identifier in said removable memory unit.

3. The distribution system of claim 2, wherein said acquisition device reads the permission information identifier from said removable memory unit, and sends the permission information identifier to said distribution server device, and said distribution server device (a) receives the permission information identifier, (b) judges whether the received permission information identifier matches the permission information identifier stored in said distribution server device, and (c) sends the maintenance information if the two permission information identifiers are judged as matching.

4. A distribution system that distributes a program for decoding encoded audio data, comprising:

a distribution server device which sends the program;

a removable memory unit which has an area for storing one or more programs which are each used for decoding encoded audio data of a different type;

an acquisition device which, being connected to said distribution server device via a network and loaded with said removable memory unit, acquires the program from said distribution server device and stores the program in said removable memory unit; and an audio reproduction device which, being loaded with said removable memory unit storing the program, decodes the encoded audio data using the program, and outputs sounds, said audio reproduction device storing a detection module beforehand, said detection module being a program module used for detecting a type of the encoded audio data, and said audio reproduction device detects the type of the encoded audio data using the detection module, reads the program for decoding encoded audio data of the detected type from said removable memory unit, and decodes the encoded audio data using the read program, wherein said distribution server device sends an alternative detection module that is a program module used, instead of the detection module stored in said audio reproduction device, for detecting the type of the encoded audio data, said acquisition device acquires the alternative detection module from said distribution server device, and stores the alternative detection module in said removable memory unit, and said audio reproduction device reads the alternative detection module from said removable memory unit, and detects the type of the encoded audio data using the alternative detection module instead of the detection module.

5. An audio reproduction device for decoding encoded audio data and outputting sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction device comprising:

a reading unit operable to read the program from the removable memory unit;

a decoding unit operable to decode the encoded audio data using the program, to generate audio data; and a sound outputting unit operable to convert the audio data to the sounds and output the sounds, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the program is made up of subprograms, and the audio reproduction device further includes a subprogram storage area which is used for storing subprograms and a loading unit operable to write the subprograms in sequence in the subprogram storage area, and the decoding unit decodes the encoded audio data using the subprograms written in the subprogram storage area.

6. An audio reproduction device for decoding encoded audio data and outputting sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction device comprising:

a reading unit operable to read the program from the removable memory unit;

a decoding unit operable to decode the encoded audio data using the program, to generate audio data; and a sound outputting unit operable to convert the audio data to the sounds and output the sounds, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the program is made up of subprograms, the audio reproduction device further includes two subprogram storage areas which are each used for storing subprograms and a loading unit operable to write the subprograms in sequence in the two subprogram storage areas alternately, and the decoding unit decodes the encoded audio data, alternately using the subprograms written in the two subprogram storage areas.

7. An audio reproduction device for decoding encoded audio data and outputting sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction device comprising:

a reading unit operable to read the program from the removable memory unit;

a decoding unit operable to decode the encoded audio data using the program, to generate audio data; and a sound outputting unit operable to convert the audio data to the sounds and output the sounds, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the removable memory unit stores a unique program beforehand, instead of the program, the audio reproduction device further includes a ROM storing unit which is made of a read-only semiconductor memory and stores a common subprogram beforehand, the program being made up of the unique subprogram and the common subprogram, a RAM storing unit which is made of a readable and rewritable semiconductor memory, and has an area for storing the unique subprogram, and a loading unit operable to read the unique subprogram from the removable memory unit, and write the unique subprogram in the RAM storing unit, and the decoding unit decodes the encoded audio data, using the common subprogram and the unique subprogram which are respectively stored in the ROM storing unit and the RAM storing unit.

8. An audio reproduction device for decoding encoded audio data and outputting sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction device comprising:

a reading unit operable to read the program from the removable memory unit;

a decoding unit operable to decode the encoded audio data using the program, to generate audio data; and a sound outputting unit operable to convert the audio data to the sounds and output the sounds, wherein the removable memory unit stores one or more programs which are each used for decoding encoded audio data of a different type, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, and wherein the removable memory unit stores an alternative detection module which is a program module used, instead of the detection module stored in the audio reproduction device, for detecting the type of the encoded audio data, the alternative detection module being sent from the distribution server device to the acquisition device and written in the removable memory unit by the acquisition device, the audio reproduction device further includes a loading unit operable to read the alternative detection module from the removable memory unit, and write the alternative detection module in the storage area, and the decoding unit detects the type of the encoded audio data using the alternative detection module instead of the detection module.

9. A computer-readable recording medium recording a distribution program for use in a distribution system that distributes a program for decoding encoded audio data, the distribution program when executed causes the distribution system to perform the steps comprising:

sending the program and permission information which indicates that the program is permitted for use from a distribution server device, in correspondence with the program using a distribution server device;

storing one or more programs which are each used for decoding encoded audio data of a different type in a removable memory unit which has an area for storing the one or more programs;

acquiring the permission information and the program from the distribution server device using an acquisition device that is connected to the distribution server device via a network and loaded with the removable memory unit, and storing the permission information and the program in the removable memory unit, the permission information being stored in correspondence with the program; and decoding the encoded audio data using the program using an audio reproduction device which is loaded with the removable memory unit storing the program, and outputting sounds, the audio reproduction device storing a detection module beforehand as a program module for detecting a type of the encoded audio data, wherein the program also causes the distribution system to generate a user identifier which identifies a user of the audio reproduction device, stores the generated user identifier, sends the generated user identifier, and also distributes maintenance information for updating the program, the acquisition device acquires the user identifier and stores the user identifier in the removable memory unit, reads the user identifier from the removable memory unit, and sends the user identifier to a distribution server device, the distribution server device (a) stores the maintenance information beforehand in correspondence with the program, (b) receives the user identifier, (c) judges whether the received user identifier matches the user identifier stored in the distribution server device, and (d) sends the maintenance information if the two user identifiers are judged as matching, and the acquisition device acquires the maintenance information, and updates the program stored in the removable memory unit using the acquired maintenance information, and the audio reproduction device detects the type of the encoded audio data using the detection module, reads the program for decoding encoded audio data of the detected type from the removable memory unit, and decodes the encoded audio data using the read program, and the audio reproduction device decodes the encoded audio data using the program, only when the permission information corresponding to the program is stored in the removable memory unit.

10. A computer-readable recording medium recording a audio reproduction program for use in an audio reproduction device that decodes encoded audio data and outputs sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction program when executed causes the audio reproduction device to perform the steps comprising:

reading the program from the removable memory unit using a reading unit;

decoding the encoded audio data using the program, to generate audio data using a decoding unit; and converting the audio data to the sounds and outputting the sounds using a sound outputting unit, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the program is made up of subprograms, and the audio reproduction device further performs the steps of:

storing subprograms in a subprogram storage area;

writing the subprograms in sequence in the subprogram storage area using a loading unit, and decoding the encoded audio data using the subprograms written in the subprogram storage area using the decoding unit.

11. A computer-readable recording medium recording a audio reproduction program for use in an audio reproduction device that decodes encoded audio data and outputs sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction program when executed causes the audio reproduction device to perform steps comprising:

reading the program from the removable memory unit using a reading unit;

decoding the encoded audio data using the program, to generate audio data using a decoding unit; and converting the audio data to the sounds and outputting the sounds using a sound outputting unit, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the program is made up of subprograms, and the audio reproduction device further performs the steps of:

storing subprograms in two subprogram storage areas;

writing the subprograms in sequence in the two subprogram storage areas alternately using a loading unit; and decoding the encoded audio data, alternately using the subprograms written in the two subprogram storage areas using the decoding unit.

12. A computer-readable recording medium recording a audio reproduction program for use in an audio reproduction device that decodes encoded audio data and outputs sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction program when executed causes the audio reproduction device to perform steps comprising:

reading the program from the removable memory unit using a reading unit;

decoding the encoded audio data using the program, to generate audio data, using a decoding unit; and converting the audio data to the sounds and outputting the sounds using a sound outputting unit, wherein the removable memory unit stores one or more programs which are each used for decoding encoded audio data of a different type, and permission information indicating that the program is permitted for use that is stored in correspondence with the program, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, the decoding unit decoding the encoded audio data using the program, only when the permission information corresponding to the program is stored in the removable memory unit, and wherein the removable memory unit stores a unique program beforehand, instead of the program, and the audio reproduction device further performs the steps of:

storing a common subprogram beforehand, the program being made up of the unique subprogram and the common subprogram using a ROM storing unit which is made of a read-only semiconductor memory;

storing the unique subprogram in a RAM storing unit which is made of a readable and rewritable semiconductor memory, and has an area for storing the unique subprogram;

reading the unique subprogram from the removable memory unit, and writing the unique subprogram in the RAM storing unit using a loading unit; and decoding the encoded audio data, using the common subprogram and the unique subprogram which are respectively stored in the ROM storing unit and the RAM storing unit, using the decoding unit.

13. A computer-readable recording medium recording a audio reproduction program for use in an audio reproduction device that decodes encoded audio data and sounds in a distribution system that includes a distribution server device, an acquisition device, and the audio reproduction device, wherein the distribution server device sends a program for decoding the encoded audio data to the acquisition device via a network, a removable memory unit is loaded to the acquisition device, the acquisition device writes the program in the removable memory unit, and the removable memory unit storing the program is loaded to the audio reproduction device, the audio reproduction program when executed causes the audio reproduction device to perform steps comprising:

reading the program from the removable memory unit;

decoding the encoded audio data using the program, to generate audio data using a decoding unit; and converting the audio data to the sounds and outputting the sounds using a sound outputting unit, wherein the removable memory unit stores one or more programs which are each used for decoding encoded audio data of a different type, the audio reproduction device includes a storage area which stores a detection module beforehand, the detection module being a program module used for detecting a type of the encoded audio data, and the decoding unit detects the type of the encoded audio data using the detection module, reads the program for decoding encoded audio data of the detected type from the removable memory unit, and decodes the encoded audio data using the read program, and wherein the removable memory unit stores an alternative detection module which is a program module used, instead of the detection module stored in the audio reproduction device, for detecting the type of the encoded audio data, the alternative detection module being sent from the distribution server device to the acquisition device and written in the removable memory unit by the acquisition device, and the audio reproduction device further performs the steps of:

reading the alternative detection module from the removable memory unit, and writing the alternative detection module in the storage area using a loading unit; and detecting the type of the encoded audio data using the alternative detection module instead of the detection module using the decoding unit.

\* \* \* \* \*